Sept. 23, 1969   R. G. RUNGE   3,469,256
ANALOG-TO-DIGITAL CONVERTER
Filed May 10, 1965   6 Sheets-Sheet 3
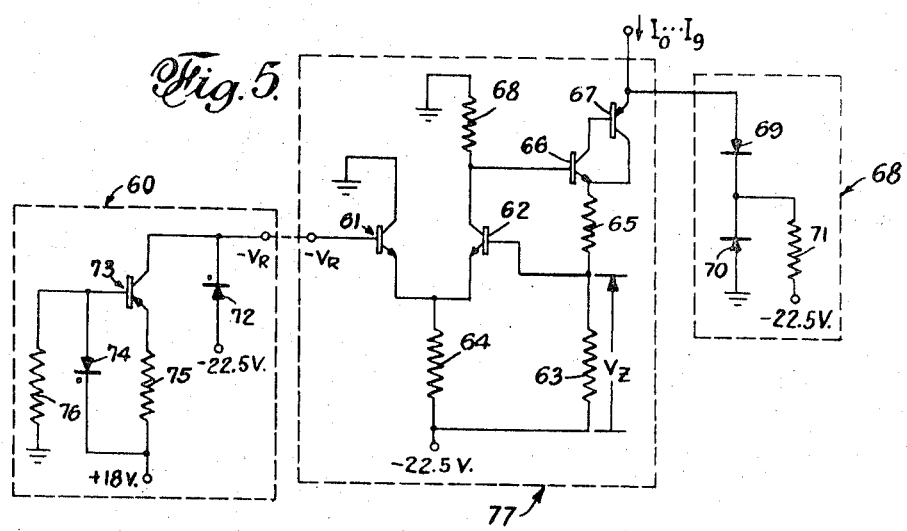
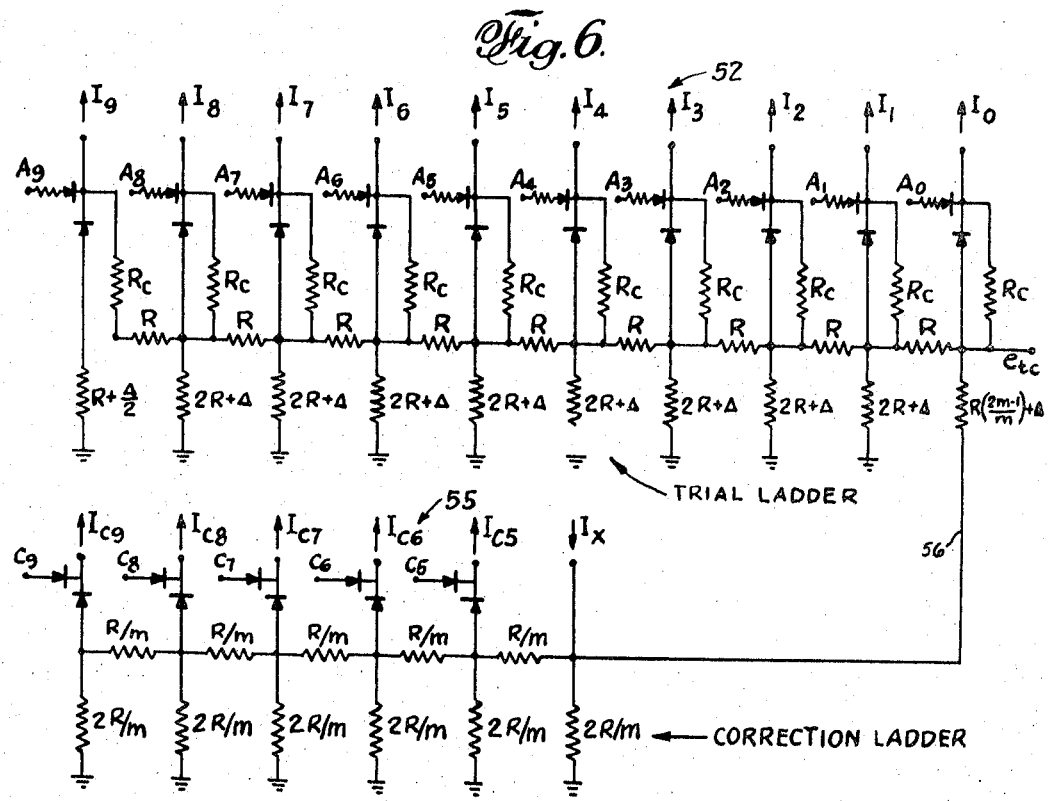
INVENTOR.
RONALD G. RUNGE
ATTORNEYS Sept. 23, 1969  R. G. RUNGE  3,469,256
ANALOG-TO-DIGITAL CONVERTER
Filed May 10, 1965  6 Sheets-Sheet 4

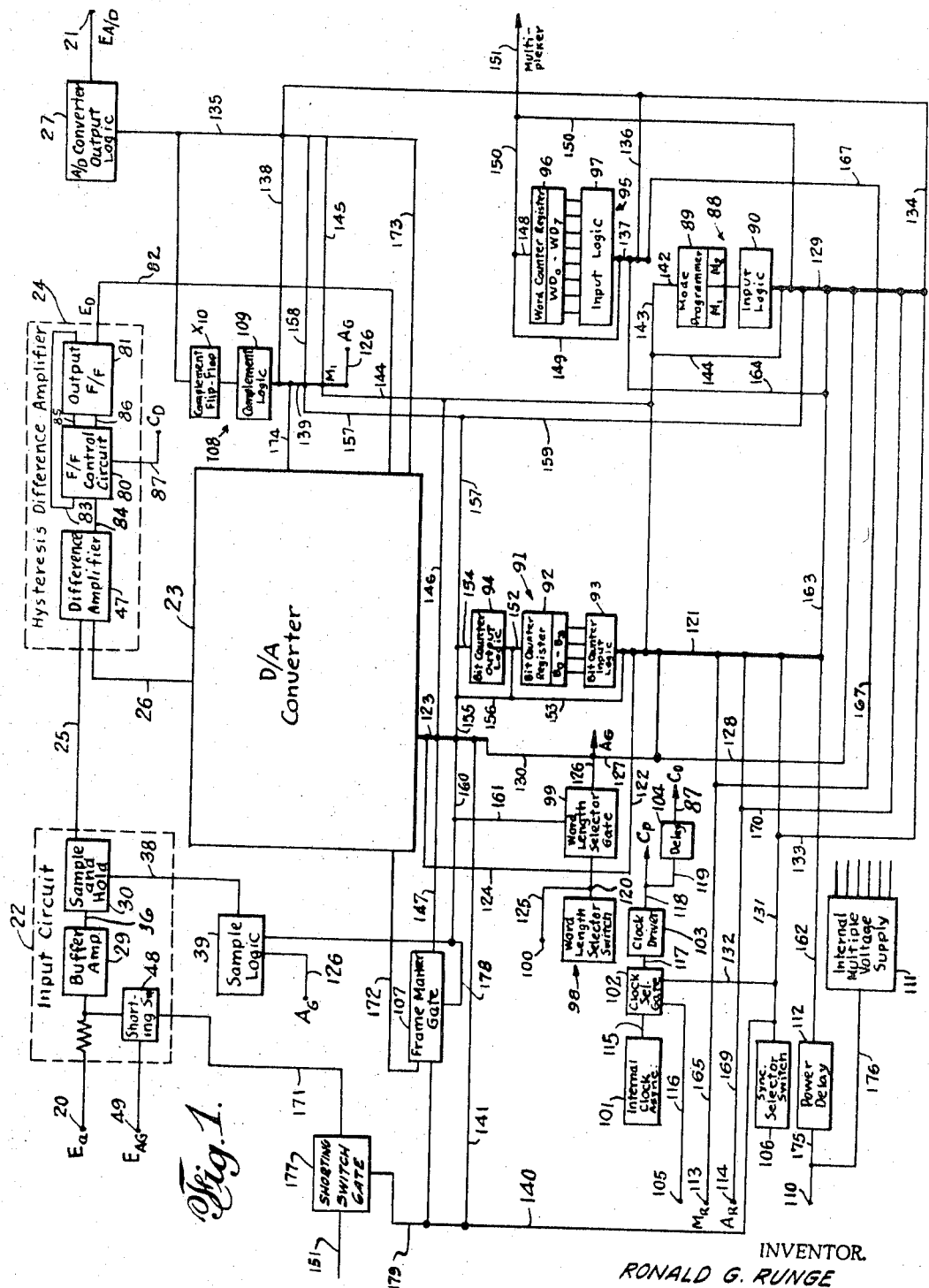

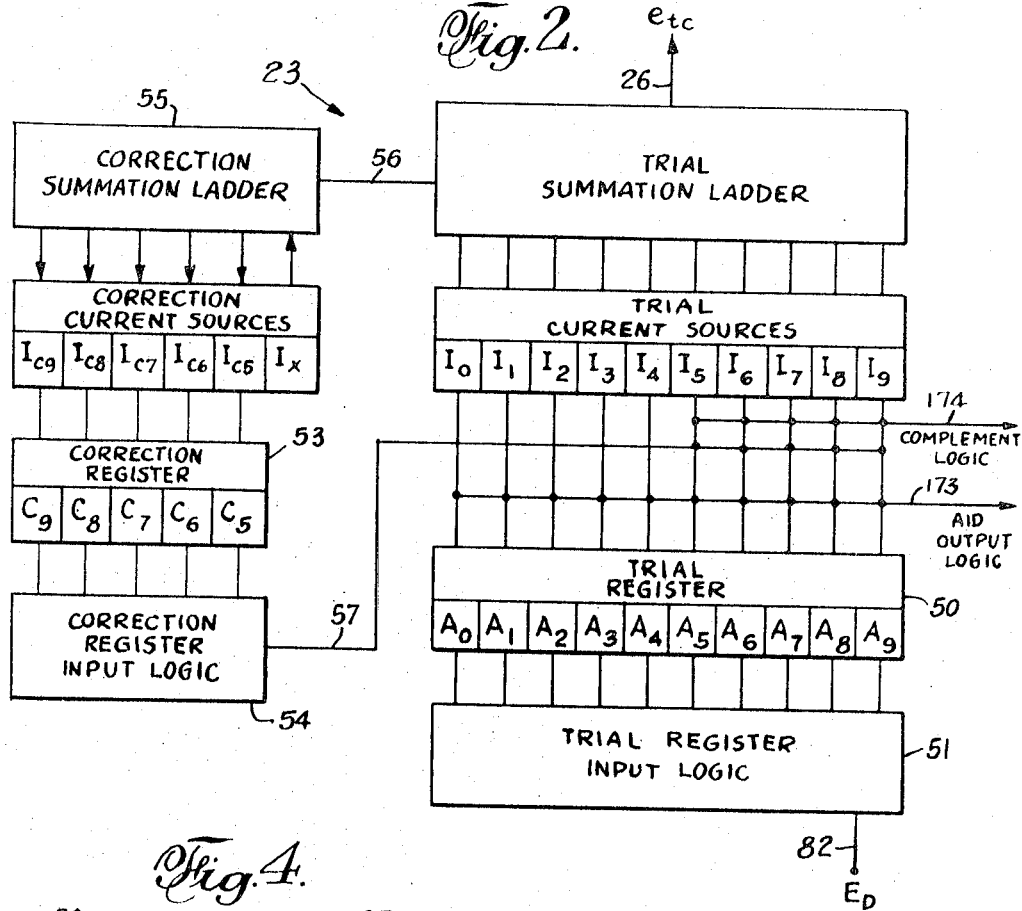
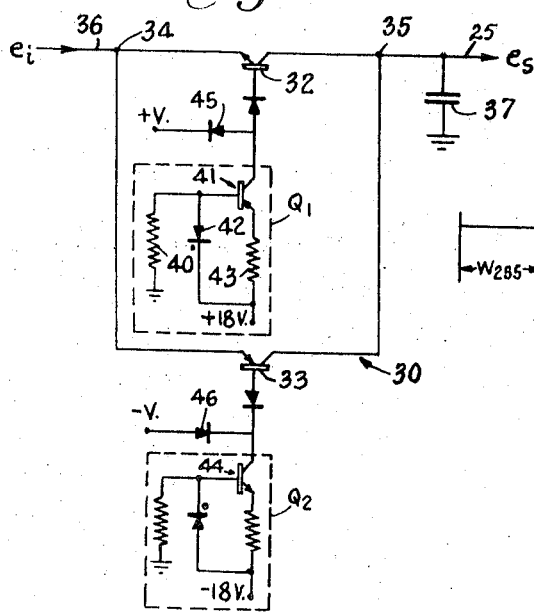
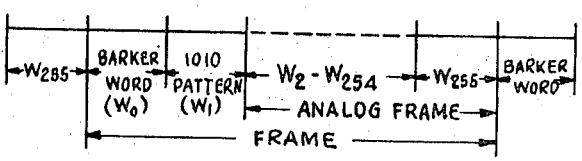

INVENTOR.
RONALD G. RUNGE
BY Fulwider, Patton, Rieber
Lee, and Utecht

ATTORNEYS

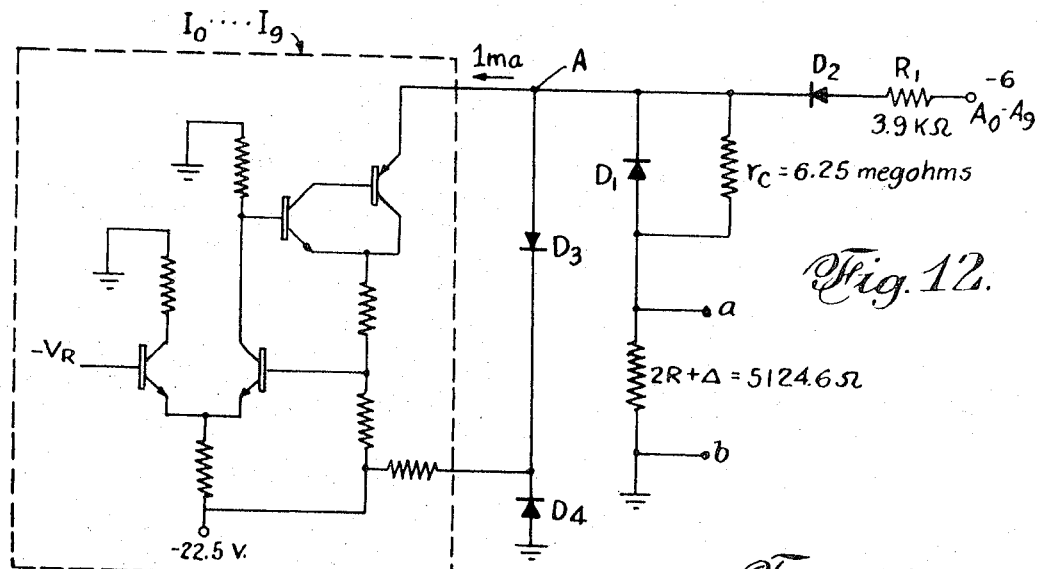

| | $M_2$ | | $\overline{M_2}$ | |
|---|---|---|---|---|
| $M_1$ | 4A<br>ANALOG<br>ENCODE<br>(ASYNC) | 3S<br>ANALOG<br>ENCODE<br>(SYNC) | 1S<br>FREEZE<br>(SYNC) | 1A<br>FREEZE<br>(ASYNC) |
| $\overline{M_1}$ | 3A<br>1010<br>PATTERN<br>(ASYNC) | 2S<br>GROUND<br>ENCODE<br>(SYNC) | 4S<br>ILLEGAL<br>MODE | 2A<br>BARKER WORD<br>AND<br>GROUND ENCODE<br>(ASYNC) |
| | $\overline{S_Y}$ | $S_Y$ | $S_Y$ | $\overline{S_Y}$ |

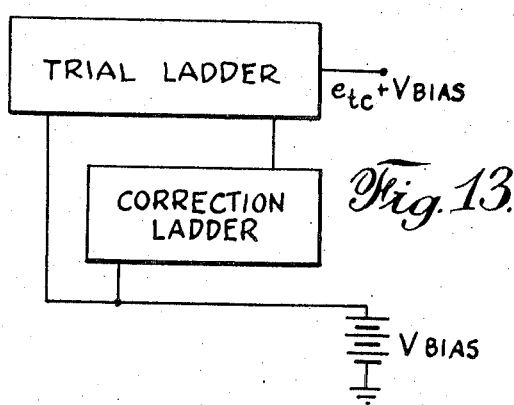

Fig. 13.

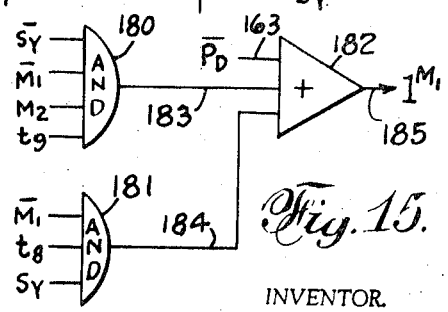

Fig. 15.

INVENTOR.
RONALD G. RUNGE
BY Zulwider, Patton, Rieber,
Lee, and Utecht.
ATTORNEYS Sept. 23, 1969  R. G. RUNGE  3,469,256
ANALOG-TO-DIGITAL CONVERTER
Filed May 10, 1965  6 Sheets-Sheet 6

Fig. 16.

|  | I<br>SYNC OR ASYNC<br>ANALOG ENCODING MODE<br>$P_D M_1 M_2 (S_Y + \bar{S}_Y)$ | | | | II<br>ASYNC<br>GROUND ENCODING BARKER WORD 1010 PATTERN<br>$P_D \bar{M}_1 \bar{S}_Y (M_2 + \bar{M}_2)$ | | | | III<br>SYNC<br>GROUND ENCODING<br>$P_D \bar{M}_1 S_Y M_2$ | | | |
|---|---|---|---|---|---|---|---|---|---|---|---|---|
|  | $B_3$ | $B_2$ | $B_1$ | $B_0$ | $B_3$ | $B_2$ | $B_1$ | $B_0$ | $B_3$ | $B_2$ | $B_1$ | $B_0$ |
| $t_0$ | 0 | 0 | 0 | 0 | 0 | 0 | 0 | 0 | 0 | 0 | 0 | 0 |
| $t_1$ | 0 | 0 | 0 | 1 | 0 | 0 | 0 | 1 | 0 | 0 | 0 | 1 |
| $t_2$ | 0 | 0 | 1 | 0 | 0 | 0 | 1 | 0 | 0 | 0 | 1 | 0 ← SW9 |
| $t_3$ | 0 | 1 | 0 | 0 | 0 | 1 | 0 | 0 | 0 | 1 | 0 | 0 ← SW8 |
| $t_4$ | 0 | 1 | 0 | 1 | 0 | 1 | 0 | 1 | 0 | 1 | 0 | 1 ← SW7 |
| SW6 → $t_5$ | 0 | 1 | 1 | 0 | 0 | 1 | 1 | 0 | 0 | 1 | 1 | 0 ← SW6 |
| SW7 → $t_6$ | 1 | 0 | 0 | 0 | 1 | 0 | 0 | 0 | 1 | 0 | 0 | 0 |
| SW8 → $t_7$ | 1 | 0 | 0 | 1 | 1 | 0 | 0 | 1 | 1 | 0 | 0 | 1 |
| SW9 → $t_8$ | 1 | 0 | 1 | 0 | 1 | 0 | 1 | 0 | 1 | 0 | 1 | 0 |
| $t_9$ | 1 | 1 | 0 | 1 | 1 | 1 | 0 | 1 | 1 | 1 | 0 | 1 |
| $t_{eow}$ | 1 | 1 | 1 | 0 | 1 | 1 | 1 | 0 | 1 | 1 | 1 | 0 |

INVENTOR.
RONALD G. RUNGE
BY Fulwider, Patton, Rieber
Lee, and Utecht
ATTORNEYS 3,469,256
ANALOG-TO-DIGITAL CONVERTER
Ronald G. Runge, 2824 Jackson Ave.,
Orange, Calif. 92667
Continuation-in-part of application Ser. No. 277,196,
May 1, 1963. This application May 10, 1965, Ser.
No. 454,572
Int. Cl. H03k 13/02
U.S. Cl. 340—347        14 Claims This is a continuation-in-part of my copending U.S. patent application Ser. No. 277,196, filed May 1, 1963, relating generally to a device for converting a bounded electrical analog function to electrical signals comprising digital words representative of the function and more specifically, to a device for programming a plurality of analog functions for the same or different periods to sampling means and for converting by a method of successive approximations the sample functions to equivalent digital words representative of the instantaneous amplitudes of the functions in either an asynchronous or synchronous mode of operation.

It is well known that missle and satellite communication systems have not proven to be entirely satisfactory. Originally, FM-FM systems were used to both relay information to and from missles. Such systems are regarded as unreliable because of the inability to reliably distinguished between noise and information modulation. These systems, also require considerable calibration, are relatively expensive, are heavy and require excessive space. Another important disadvantage of FM-FM systems is that the information being relayed must be transmitted in analog form. This latter disadvantage requires the use of conversion equipment when the information is to be utilized in conjunction with digital type computers.

For the above reasons PCM-FM systems are currently supplanting FM-FM systems. One of the principal advantages of PCM-FM systems is that the information being transmitted is in digital form and hence is virtually unaffected by noises developed in the transmission link. In order to provide a digitized transmission signal it is required that such systems utilize analog-to-digital, or A/D, converters to effect quantitization of analog input functions so they may be transmitted in PCM form. In order to accomplish this to best advantage, the A/D converters utilized must provide a serial output. Such converters must be capable of operating at speeds sufficiently fast to accurately encode analog information from a relatively large number of transducers.

Applications of present A/D converters in such systems have been limited due to their inability to digitize analog functions with sufficient accuracy and speed to satisfactorily represent the functions. A further disadvantage of present A/D converters is that they are especially designed for specific system requirements and cannot be adapted to accommodate other system requirements without complete physical and electrical rearrangement. In addition, the power consumption of present converters is extremely large relative to the low requirements that may be attained by the device of this invention. Furthermore, many converters do not operate over the wide environmental conditions imposed by air borne telemetry. Present converters have low input impedances and require multiple D.C. power sources. Additionally, present converters either have no means or inadequate means for synchronization.

BRIEF DESCRIPTION OF THE INVENTION

Basically, the A/D converter of the present invention includes a novel input circuit, an internal digital-to-analog, or D/A converter, a hysteresis difference amplifier and an A/D converter output circuit. Circuitwise the outputs of the input circuit and the D/A converter are coupled to the input of the hysteresis amplifier whose ouput, determined by the magnitudes of the voltages supplied by the output voltages of the input circuit and the D/A converter, is coupled to the input logic of the D/A converter to establish the digital state, i.e., "one-set" or "zero-set," of the A/D output circuit.

The input circuit includes a sample-and-hold circuit capable of sampling instantaneous amplitudes, $e_i$, of analog input functions supplied thereto and providing an output voltage, $e_s$, equal in magnitude to the particular input voltage, $e_i$, which is maintained for a period of time corresponding to the number of bits utilized to form digital words expressing the voltage, $e_i$, which will appear at the output of the A/D output circuit.

The D/A converter employed in the above arrangement provides a trial corrected output voltage, $e_{tc}$, for each bit of a digital word. The magnitude of this voltage, $e_{tc}$, is dependent upon a correction voltage, $e_c$, which remains constant for the duration of each analog frame constituted by a selectable number of digital words, and the output of a trial voltage summation ladder network which is determined by the states of the flip-flops forming a trial register which govern the application of various fixed valued current sources to the trial voltage summation ladder network. The states of the trial register flip-flops are determined, in a manner to be described, by the output of the hysteresis difference amplifier in conjunction with control pulses developed by other components of the A/D converter. At this point it will suffice to say that the flip-flops forming the trial register of the D/A converter are unconditionally "one-set" by timing pulses in a sequence determined by the number of bits selected to form a digital word and are conditionally "zero-set" or left in their "one-set" state as determined by the output of the hysteresis difference amplifier after the trial voltage of each bit has been compared to the sample voltage, $e_s$, within the difference amplifier. The states of the flip-flops of the trial register after they have been conditionally "set" are serially read out to the A/D converter output circuit and constitute the bits forming the digital word defining the instantaneous value of the analog input voltage, $e_i$.

The procedure utilized to determine each digital word and of course the setting of the flip-flops of the trial register is known as the method of successive approximations. By this method, the output voltage, $e_{tc}$, of the D/A converter is caused to approach the value of the sampled voltage, $e_s$, in a logical sequence of steps. More particularly, the analog input voltage is first compared with a trial voltage automatically generated during the first bit-time of a digital word. This trial voltage is equal to one-half the maximum bounded value of the input analog function. If the magnitude of the sample is greater than the magnitude of the trial, a new trial is generated in the second bit-time equal to three-fourths the maximum value of the sample. If the magnitude of the sample is less than the magnitude of the trial, a new trial is generated in the second bit-time equal to one-fourth the maximum value of the sample. Stated differently, if the output of the difference amplifier is zero, or false, occurring when $(e_s-e_{tc})$ is negative, the next trial will be three-fourths. However, if the output of the hysteresis difference amplifier is true, that is, one, then the next trial will be one-fourth, occurring when $(e_s-e_{tc})$ is positive. This sequence continues until the sample and trial voltages are in approximate agreement.

It is apparent that as the number of bits per word increases, the accuracy of the trial conversion increases; however, it is also apparent that a longer time is required for conversion (assuming the same bit rate). In general a finite number of bi-stable elements are used to generate the trial voltages. The number of possible trial states is limited by the number of bi-stable elements employed in the D/A converter.

If there are $n$ bi-stable elements, then they have $2^n$ digital states which may be converted into $2^n$ analog trial voltages. For example, if there are ten bi-stable elements, then there are $2^{10}$ or 1024 possible analog voltages. Thus each sampled increment may be converted to one of 1024 magnitudes. If there are six bi-stable elements, then there are 64 possible trial voltages.

OBJECTS OF THE INVENTION

In view of the foregoing, it is an object of the present invention to provide a new and improved A/D converter overcoming the above enumerated disadvantages.

Another object is to provide an A/D converter capable of handling high input information frequencies and converting the input function to a digitized output equivalent having a high degree of accuracy.

A further object of the invention is the provison of an A/D converter having means for periodically automatically correcting for differences between the analog system ground and the A/D converted ground, offset in sample-and-hold circuitry, and drift due to temperature variations in conversion circuits of the system.

Another object of the invention is the provision of an A/D converter having a degree of flexibility whereby the number of bits forming a digital word length may be selectively varied to suit the requirements of particular uses.

A further object is the provision of an A/D converter embodying a hysteresis difference amplifier as an integral part thereof whereby an output signal from the amplifier will not be falsely generated in the presence of shot-noise and other noises such as Johnson noise, and transister noises generated between 20 kc. and 5 mc. wherein the signal difference must be greater than these noise signals to effect a change in the output of the amplifier. Another object of the invention is the provision of an A/D converter including a sample-and-hold analog input circuit as an integral part thereof, thus allowing the converter to digitize greater band widths of analog input information signals than is possible without the use of such a sample-and-hold circuit.

Another object of the invention is the provision of an A/D converter utilizing a single source of D.C. supply power voltage to convert to multiple D.C. supply levels with maximum efficiency and minimum component requirements.

Another object of the invention is the provision of an A/D converter having a trial voltage register and a correction voltage register wherein the trial register generates a compensating voltage equal to the error constituting the difference between the analog ground and the converter ground, drift within the converter resulting from its wide range of allowable operating environments and other internal errors, and a means whereby this exact correction voltage is shifted without alteration to the correction register and further means whereby the correction voltage compensates subsequent trial voltages developed in the trial voltage register.

A further object is to provide an A/D converter which may operate from its own timing clock or from an external timing clock.

It is another object of this invention to provide an A/D converter whose digital word length may be varied by programming.

Another object of the invention is the provision of an A/D converter which includes means for externally starting and stopping encoding of the converter.

A further object of this invention is the provision of an A/D converter which includes means for generating Barker and 1010 sync-words to provide means whereby each frame and the time period of each bit can be identified by equipment receiving the output of the converter.

Another object of this invention is the provision of an A/D converter which includes means for developing timing levels for controlling a multiplexer.

Another object of this invention is the provision of an A/D converter which includes means whereby high accuracy input information may be encoded in longer word lengths than lower accuracy input information.

This invention also has for its object the provision of such means that are positive in operation, convenient in use, easily installed in working position and easily disconnected therefrom, economical of manufacture, relatively simple and of general superiority and serviceability.

The invention also comprises novel details of construction and novel combinations and arrangements of parts which will more fully appear in the course of the following description and which is based on the accompanying drawings. However, said drawings merely show, and the following description merely describes, preferred embodiments of the present invention, which is given by way of illustration and example only.

BRIEF DESCRIPTION OF DRAWINGS

FIG. 1 is a block diagram of a preferred form of an A/D converter in accordance with the present invention;

FIG. 2 is a more detailed block diagram of a D/A converter forming a part of FIG. 1;

FIG. 3 is a diagram showing the construction of a digital frame as utilized in the device of FIG. 1;

FIG. 4 is a circuit diagram of a sample-and-hold circuit forming a part of the A/D converter shown in FIG. 1;

FIG. 5 is a circuit diagram of current sources utilized in the D/A converter shown in Fig. 2;

FIG. 6 is a circuit diagram of trial and correction current to voltage summation networks forming a part of the D/A converter shown in FIG. 2;

FIG. 12 is a circuit diagram utilized to describe the operation of the current sources shown in FIGS. 5 and 7;

FIG. 13 is a block diagram showing how the trial and correction networks of FIG. 6 may operate in a bipolar manner;

FIG. 14 is a Veitch diagram showing various modes of operation of the A/D converter of FIGS. 1 and 2;

FIG. 15 is a representative diagram of the logical circuits utilized in the A/D converter shown in FIGS. 1 and 2;

FIG. 16 is a chart showing the counting sequences of a bit counter forming a part of the converter shown in FIGS. 1 and 2.

DETAILED DESCRIPTION

Figure 7:
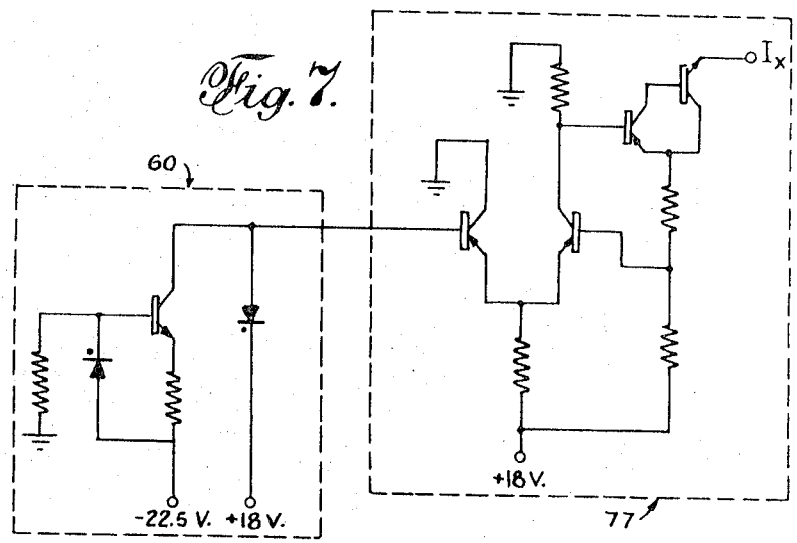
FIG. 7 is a circuit diagram of a biasing current source utilized in the D/A converter shown in FIG. 2.

The embodiment of the A/D converter of the present invention, shown in block diagram form in FIGS. 1 and 2, is utilized to convert an analog input voltage, $E_a$, applied to input terminal 20 to a representative digital output voltage, $E_{A/D}$, appearing at the output terminal 21. The input voltage, $E_a$, may be any bounded analog function representing some analog function to be digitized, but for the purposes of this description, constitutes a bounded variable voltage. In the present example, the output voltage, $E_{A/D}$, which is expressed in terms of the binary code and, as will be described later, constitutes digital words that may be varied over a wide range of bits depending upon the requirements of the individual uses of the converter. While in this embodiment the input voltage is limited to a negative polarity having a bounded range from zero to $-5.12$ volts, it is to be understood that by conventional engineering practice the magnitude of this range may be increased or decreased, and that the input voltage may have a positive polarity or may comprise both positive and negative polarities.

The present embodiment may be operated asynchronously wherein the time-clock pulses are derived from an internal clock; or it may be operated synchronously from an external clock which may be associated with the system providing the analog voltage and/or systems utilizing the converter. In order to more clearly understand the following description of the converter, one of successive cycles of the digital output for the asynchronous mode of operation will be described with reference to FIG. 3. As shown, the digital output comprises a group of digital words $W_0$–$W_{255}$, including a pair of sync-words, $W_0$ and $W_1$, $W_2$–$W_{255}$ are referred to as a digitized analog frame. It is to be understood in this embodiment that the number of bit-times in a digital word may be varied between six and ten bits, and that the number of digital words in an analog frame may be varied to suit the particular uses of the converter.

Basically, the form of the converter shown comprises an input circuit 22; an internal D/A converter 23; a hysteresis difference amplifier 24 whose input is supplied through the connections 25 and 26 from the outputs of the input circuit and the D/A converter; and an output logical circuit 27 whose output is connected to the output terminal 21. The converter further includes various counting, timing, mode programming and control circuits to be described later.

INPUT CIRCUIT

More specifically, the input circuit 22 consists of a conventional transistorized unity gain buffer amplifier 29 and a sample-and-hold circuit 30. The buffer amplifier 29 is provided so as to present a high impedance to the analog input signal, $E_a$, so that the signal will not be attenuated. This amplifier is also designed so that it has an output impedance less than 10 ohms to facilitate rapid charging and discharging of a sampling capacitor forming a part of the sample-and-hold circuit.

As shown in FIG. 4, the sample-and-hold circuit 30 comprises an npn type transistor 32; a pnp type transistor 33 connected in parallel at points 34 and 35 with respect to the input lead 36 from the buffer amplifier and the lead 25 connecting the output of this circuit to the input of the hysteresis difference amplifier; and a sampling capacitor 37 connected between the lead 25 and ground. These transistors are simultaneously gated "on" to sample the instantaneous value, $e_i$, of the analog input voltage, $E_a$, appearing at the input lead 36 by $+\nu$ and $-\nu$ output control signals. These signals comprise the output voltages of a sample logic and control circuit 39, see FIG. 1, in response to the application of either a timing pulse $t_9$ or an agreement signal $A_G$ to the input of the control circuit 39. The transistors 32 and 33 constitute a bilateral solid state switch which permits current to be delivered to or caused to flow from the sampling capacitor 37 depending upon the relative magnitudes of the voltage of the sampling capacitor from a previous sample and the magnitude of the voltage $e_i$ being sampled. In addition, the transistors 32 and 33 are driven by conventional current sources, $Q_1$ and $Q_2$, therefore making the offset of the switch independent of the input voltage. The current source $Q_1$ comprises the resistor 40 connected between ground and the base of a pnp transistor 41, a Zener diode 42 connected between the base of the transistor and a +18 volt supply and a resistor 43 connected between the emitter of the transistor and the +18 volt supply. The current source $Q_2$ is similar to the source $Q_1$ but utilizes an npn type transistor 44 energized from a −18 volt source.

When either the $t_9$ or $A_G$ pulses occur the diode 45 will go positive and the diode 46 will go negative and the current from $Q_1$ and $Q_2$ will be delivered to the bases of the transistors 32 and 33 switching them "on." At all other bit times, the current will be shunted through the diodes 45 and 46; thus transistors 32 and 33 will be "off." By adjusting the current of either $Q_1$ or $Q_2$ the offset voltage of this switch can be set to zero.

In regard to this circuit, it is to be noted that the output is connected by lead 25 to the input of a four stage direct coupled transistorized difference amplifier 47 of the hysteresis difference amplifier 24. While the amplifier 47 is conventional in construction, the input transistor is of the field effect type; hence, the amplifier does not draw current from the sampling capacitor 37 since such field effect transistors do not require a base current. Additionally, the input transistor of the amplifier 47 presents an input impedance equivalent to that of two reversed biased diodes.

By virtue of the above input circuit arrangement, each time the control circuit 39 provides the output or sampling voltages, $+\nu$ and $-\nu$, in response to the pulse $t_9$ and $A_G$ at the end of each digital word, an instantaneous value of the input voltage appears across the sampling capacitor 37 and is maintained or held there for the duration of the number of bit-times required for a digital word to be formed. When the sample pulses occur, the diodes 45 and 46 assume the $-\nu$ and $+\nu$ polarities shown, thus permitting the sampling capacitor to charge up to within .01% of the output of the buffer amplifier in one bit time. Upon removal of the sample pulses, the voltages $-\nu$ and $+\nu$ reverse and the sampling capacitor will decay only a negligible amount since it essentially sees during this interval two reversed pn semi-conductor junctions formed by the field effect input transistor of the amplifier 47. The leakage currents of transistors 32 and 33 cancel each other. Thus it can be seen that the use of two transistors in parallel in the sample-and-hold circuit allows the sampling capacitor to act as a current source or current sink and attain the properties of a bilateral switch.

The advantages of the above described input circuit, wherein the instantaneous sample values of the input voltage are sampled and maintained in magnitude for the duration of the comparisons necessary to form a digital word (and only that duration +1 bit time), as opposed to systems wherein the analog input is not sampled and held, may be clearly seen from the following considerations.

The maximum unsampled sinusoidal input analog function that can be converted into a digital signal for a given bit rate and word length may be derived as follows.

First:

(1) $$e_{as} = e_{ap} \sin \omega t$$

where $e_{as}$ = instantaneous value of the analog voltage
$e_{ap}$ = peak value of analog voltage Then:

(2) $$\frac{de_{as}}{dt} = \omega e_{ap} \cos \omega t$$

Since the maximum rate of change occurs when $\omega t = 0$, thus:

(3) $$\frac{de_{as}}{dt_{max.}} = \omega e_{ap}$$

However, in order for the encoding to be correct, the analog voltage must not change at a rate greater than one-half the least significant bit in the number of bit-times defining a word time.

Accordingly, if;

$n$ = number of bits per digital word
$2e_{ap}$ = maximum bounded value of the analog voltage
$B_r$ = bit rate in cycles/sec or pulses/sec Then the least significant bit may be expressed as:

$$\frac{2e_{ap}}{2^n} = \text{magnitude of least significant bit}$$

and:

$$\frac{e_{ap}}{2^n} = \text{magnitude of } \frac{1}{2} \text{ least significant bit}$$

Then:

(4)

$$\frac{e_{ap}B_r}{n2^n} = \text{maximum allowable rate of change of input information (volts/sec.)}$$

Equating Equations 3 and 4, the following is obtained:

(5)

$$\omega = \frac{B_r}{n2^n}$$

Thus:

(6)

$$f_{max.1} = \frac{B_r}{\pi n 2^{n+1}} \text{ (without sample-and-hold)}$$

Since according to Shannon's sampling theorem, input information can be reconstructed if two samples are taken of the highest input information frequency, thus:

(7)

$$f_{max.2} = \frac{B_r}{2n} \text{ (with sample-and-hold)}$$

Accordingly, the improvement factor, I, realized when an input circuit such as that described above is utilized, is as follows:

(8)

$$I = \frac{f_{max.2}}{f_{max.1}} = \pi 2^n$$

In accordance with Equation 8, the following improvement can be seen for the values of $n$ equal to 6, 7, 8, 9 and 10 utilized in the present converter with the above described input circuit, where $B_r =$ one megacycle per second.

| $n$ | $f_{max1}$ | $f_{max2}$ | I (approx.) |
|---|---|---|---|
| 1 | .414 kc | 83.3 kc | 200 |
| 6 | .180 kc | 71.4 kc | 400 |
| 7 | .080 kc | 62.5 kc | 800 |
| 8 | .035 kc | 55.5 kc | 1,600 |
| 90 | .016 kc | 50.0 kc | 3,200 |

In addition to providing means for making periodic instantaneous samples, $E_s$, of the input voltage, $E_a$, the input circuit also includes a shorting switch 48. The shorting switch is a conventional transistorized switch which is gated on during $W_{255}$. The shorting switch is utilized to connect the analog system ground appearing at terminal 49 to the input of the buffer amplifier. Operation of the switch enables the input circuit 22 to sample the analog ground potential, $E_{AG}$, at the end of each frame to be utilized with a correction arrangement, to be described. As will be seen, this sampled value of $E_{AG}$ is utilized to develop a compensating voltage to be combined with the trial voltages generated by the trial voltage summation ladder network of the D/A converter to correct for differences between the analog system and the A/D converter grounds and drifts within the converter. This correction voltage will be applied to the trial voltages for each digital word developed during an entire analog frame and a new correction voltage will be established each analog frame.

DIGITAL-TO-ANALOG CONVERTER

The D/A converter 23, shown diagrammatically in FIG. 2, is utilized in conjunction with the sampled voltage, $e_s$, and the output of the hysteresis difference amplifier 24 to effect a digital output from the A/D converter output circuit 27 representative of each voltage $e_s$ established by the input circuit 22.

As shown in FIG. 2, the D/A converter comprises a trial register 50 formed by ten conventional flip-flops $A_0$–$A_9$. These flip-flops are logically gated to their "one-set" or "zero-set" states by the input logical circuit 51. As will be described, the logical circuit 51 is controlled by various timing, programming and control signals. When the flip-flops $A_0$–$A_9$ are variously set in their "one-set" states, they apply a minus six volt actuating potential to corresponding current sources $I_0$–$I_9$, shown in detail in FIG. 5. Upon such actuation, the currents from these sources are supplied to corresponding bit stages of a trial voltage summation ladder network 52 shown in detail in FIG. 6. In this network the current sources $I_0$ and $I_9$ supply the most significant and least significant currents, respectively. The voltage developed in the network 52 upon the "one-setting" of the flip-flop $A_0$ has a magnitude equal to one-half the maximum bounded value of the converter analog input voltage and the voltages of each succeeding stage of the network which is controlled by the flip-flops $A_1$ to $A_9$, respectively, diminishes by one-half successively from this value. The output of the network 52 constitutes a trial voltage, $e_t$, having a magnitude determined by the number of flip-flops $A_0$–$A_9$ that are in their "one-set" state.

In addition to developing the above described trial voltages, the D/A converter also includes means whereby a correction voltage, $e_c$, may be established and applied to the trial voltages for each frame. The correction voltage is developed upon closing of switch 48 by the trial voltage summation ladder network 52 during the word, $W_0$. At the end of $W_0$ the states of the last five bits of the trial register are copied into a correction register, thereby establishing a correction voltage whose magnitude is defined by the states of the last five bits of the trial register. When the A/D converter is operating in its asynchronous mode this correction voltage is reestablished at the beginning of each frame. When the A/D converter is operating in the synchronous mode this correction voltage is reestablished when an external master reset signal, $M_R$, to be later defined, is supplied to the converter. Each correction voltage established has a magnitude providing compensation for internal voltage drift in the conversion circuits of the A/D converter and the difference between the analog system and the A/D converter ground potenials.

The correction means includes a correction register 53 formed by the flip-flops $C_5$–$C_9$ which are controlled by the input logical circuits 54. As in the case of the trial register, the "one-set" states of flip-flops $C_5$–$C_9$ cause application of the current sources $I_{C5}$–$I_{C9}$ to the ladder network 55, which in turn permits the development of voltages of weighted magnitudes in the correction voltage summation ladder network 55, shown in detail in FIG. 6. The output of the summation ladder 55 is combined through the connection 56 with the output of the trial voltage summation ladder 52 to effect trial corrected voltages, $e_{tc}$, which are connected through lead 26 to the input of the difference amplifier 47.

The correct section of the D/A converter also includes a biasing current source $I_X$, shown in FIG. 7, which generates a positive bias voltage $E_X$, of 77.5 millivolts at the output of the trial voltage summation ladder 52. The remaining current sources are connected to the correction summation ladder 55 upon the "one-setting" of each of the flip-flops $C_5$–$C_9$ during the first word time $W_0$ for both the synchronous and asynchronous modes of operation.

Figure 8:
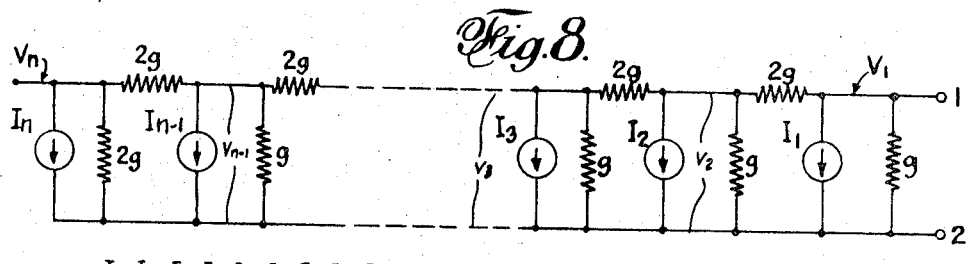
FIGS. 8, 9, 10 and 11 show circuit diagrams employed to describe the operation of the summation networks shown in FIG. 6.

In order to understand the operation of the trial and correction voltage summation ladders, the conventional derivation of the open circuit voltage of a current to voltage summation ladder similar to that shown in FIG. 6 will be shown with reference to FIG. 8 where the conductances $g = 1/2R'$ and $2g = 1/R'$.

In FIG. 8 the current summations are as follows:

$I_n = ov_1 + ov_2 + ov_3 + \ldots ov_{n-2} - 2gv_{n-1} + 4gv_n$ $I_{n-1} = ov_1 + ov_2 + ov_3 + \ldots ov_{n-3} - 2gv_{n-2} + 5gv_{n-1} - 2gv_n$ $I_{n-2} = ov_1 + ov_2 + ov_3 + \ldots ov_{n-4} - 2gv_{n-3} + 5gv_{n-2} - 2gv_{n-1} + ov_n$ $\vdots$ $I_3 = ov_1 - 2gv_2 + 5gv_3 - 2gv_4 - ov_5 + \ldots ov_n$ $I_2 = -2gv_1 + 5gv_2 - 2gv_3 + ov_4 + \ldots ov_n$ $I_1 = 3gv_1 - 2gv_2 + ov_3 + \ldots ov_n$ Using Cramer's rule it may be shown that:

$$v_1 = \frac{C_1}{\Delta} I_1 + \frac{C_2}{\Delta} I_2 + \frac{C_3}{\Delta} I_3 + \cdots \frac{C_{n-3}}{\Delta} I_{n-3} +$$

$$\frac{C_{n-2}}{\Delta} I_{n-2} + \frac{C_{n-1}}{\Delta} I_{n-1} + \frac{C_n}{\Delta} I_n$$

where:

$\Delta$ = the determinant formed by the coefficients of voltages of all rows and columns $C_i$ = the determinant formed by the coefficients of the voltages of all rows except the $i^{\text{th}}$ and all columns except the first, with $i$ an integer greater than zero but less than or equal to $n$.

By employing the above general equation for $n = k+1$ where $k$ is an integer greater than unity it can be shown by induction that:

(10)
(11)
$$\Delta = 2^{2n-1} g^3$$
$$C_i = 2^{(2n-1)-i} \cdot g^2$$

(12) $$D_i = \frac{C_i}{\Delta} = \frac{2^{(2n-1)-i} \cdot g^2}{2^{2n-1} \cdot g^3} = \frac{1}{2^i} \cdot \frac{1}{g} = \frac{R'}{2^{i-1}}$$

where: $D_i$ = coefficient of the $I^{\text{th}}$ current.

In considering current summation in the above example, it may be seen by inspection that when the currents are equal to zero the conductance between terminals 1 and 2 is $2g$; thus the resistance between these terminals is $R'$. Since the open circuit voltage has been determined and the equivalent resistance with the generators equal to zero is known, then the entire circuit of FIG. 8 may be reduced by Thevinen's Theorem to an equivalent trial voltage, $E_T$, from a resistance $R'$, derived from the current to voltage summation ladder shown in FIG. 6.

Accordingly, the values for D for the open circuit voltage $e_t$ of the representative trial current to voltage summation ladder of FIG. 8, using Equation 12 for $n = 10$ and $R' = R$ are as follows:

$D_0 = R$      $D_5 = R/32$
$D_1 = R/2$      $D_6 = R/64$
$D_2 = R/4$      $D_7 = R/128$
$D_3 = R/8$      $D_8 = R/256$
$D_4 = R/16$      $D_9 = R/512$ or:

(13) $$e_t = R\left(I_0 + \frac{I_1}{2} + \frac{I_2}{4} + \cdots \frac{I_8}{256} + \frac{I_9}{512}\right)$$

Figure 9:
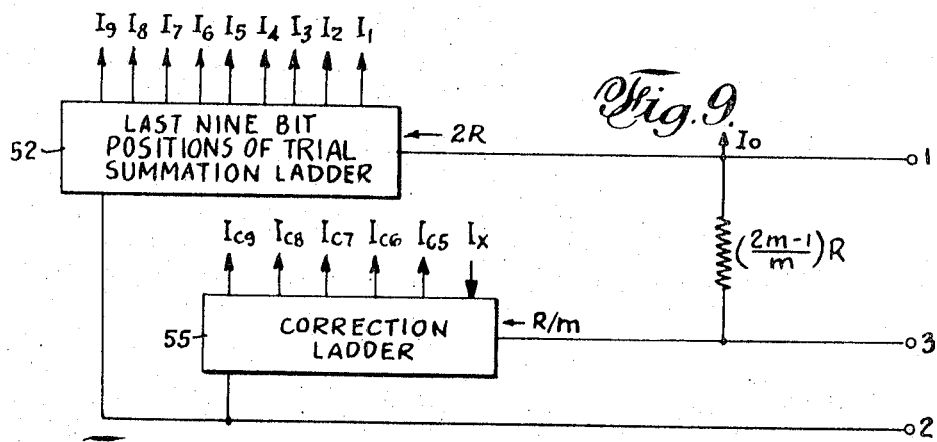

To determine the effect of the correction ladder, only a close inspection of the trial and correction current to voltage summation ladders, as represented in FIG. 9, is required.

In such a case, where $m$ equals an integer greater than 1:

(14) $$\frac{R}{m} + \left(\frac{2m-1}{m}\right) R = 2R$$

Hence it can be seen that the addition of the correction ladder with the trial ladder, as shown in FIG. 6, does not alter the resistance between terminals 1 and 2 nor the Thevinen equivalent voltage when all correction currents are zero.

Figure 10:
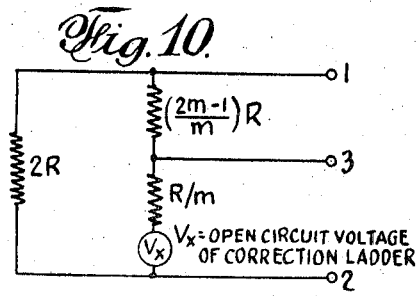

In order to determine the voltage effect with the addition of a parallel correction ladder to the trial ladder arrangement of FIG. 8 the Theorem of Superposition is employed. In this case, if the trial currents $I_0$–$I_9$ are equal to zero and the Thevinen equivalent voltage of the correction ladder is found by finding the open circuit voltage from the general Equation 9 and the resistance with all current sources equal to zero is found by inspection, then it may be seen from FIG. 10, that the contribution of a correction ladder to the trial ladder of FIG. 8 as measured between terminals 1 and 2 is:

(15) $$e_C = \frac{v_x}{2}$$

Hence, for a six position ladder, similar to the correction ladder of FIG. 6 where $n$ equals six, by employing Equation 12 and assuming $R' = R/m$ the following values of D would be obtained.

$D_1 = R/m$      $D_4 = R/8m$
$D_2 = R/2m$      $D_5 = R/16m$
$D_3 = R/4m$      $D_6 = R/32m$

(16) $$v_x = \frac{R}{m}\left[I_x + \frac{I_{C5}}{2} + \frac{I_{C6}}{4} + \frac{I_{C7}}{8} + \frac{I_{C8}}{16} + \frac{I_{C9}}{32}\right]$$

Thus:

(17) $$e_C = \frac{v_x}{2} = \frac{RI_x}{2m} + \frac{R}{2m}\left[\frac{I_{C5}}{2} + \frac{I_{C6}}{4} + \frac{I_{C7}}{8} + \frac{I_{C8}}{16} + \frac{I_{C9}}{32}\right]$$

Then from the Theorem of Superposition:

(18) $$e_{TC} = e_T + e_C$$

Similarly, for a ladder having ten trial bit positions and five corrected bit positions:

(19)
$$e_{TC} = R\left[I_0 + \frac{I_1}{2} + \frac{I_2}{4} + \frac{I_3}{8} + \cdots \frac{I_8}{256} + \frac{I_9}{512}\right] +$$
$$\frac{RI_x}{2m} + \frac{R}{2m}\left[\frac{I_{C5}}{2} + \frac{I_{C6}}{4} + \frac{I_{C7}}{8} + \frac{I_{C8}}{16} + \frac{I_{C9}}{32}\right]$$

Hence, if $m = 8$, then in the above example:

(20)
$$e_{TC} = R\left[I_0 + \frac{I_1}{2} + \frac{I_2}{4} + \frac{I_3}{8} + \cdots \frac{I_8}{256} + \frac{I_9}{512}\right] +$$
$$\frac{RI_x}{16} + R\left[\frac{I_{C5}}{32} + \frac{I_{C6}}{64} + \frac{I_{C7}}{128} + \frac{I_{C8}}{256} + \frac{I_{C9}}{512}\right]$$

Thus it can be seen that if the correction ladder currents $I_{C5}$–$I_{C9}$ are each equal to the trial ladder currents $I_5$–$I_9$, the weights of the correction voltages for these bit positions are exactly the same, position for position.

Accordingly, applying Equations 19 and 20 to the trial and correction current to voltage summation ladders of FIG. 6, the corrected trial voltages are as follows:

(21)
$$E_{TC} = -R\left[I_0 + \frac{I_1}{2} + \frac{I_2}{4} + \cdots \frac{I_8}{256} + \frac{I_9}{512}\right] -$$
$$\frac{R}{2m}\left[\frac{I_{C5}}{2} + \frac{I_{C6}}{4} + \frac{I_{C7}}{8} + \frac{I_{C8}}{16} + \frac{I_{C9}}{32}\right] + \frac{I_x R}{2m}$$

Hence when $m=8$:

(22)
$$E_{TC}=-R\left[I_0+\frac{I_1}{2}+\frac{I_2}{4}+\frac{I_3}{8}+\cdots\frac{I_8}{256}+\frac{I_9}{512}\right]-$$
$$R\left[\frac{I_{C5}}{32}+\frac{I_{C6}}{64}+\frac{I_{C7}}{128}+\frac{I_{C8}}{256}+\frac{I_{C9}}{512}\right]+\frac{I_xR}{16}$$

In the present embodiment, the trial and correction ladders of FIG. 6 may be used to convert an analog voltage to representative digital binary words of six to ten bit positions when each of currents $I_0$–$I_9$ and $I_{C5}$–$I_{C9}$ are equal. In this case flip-flops $A_0$–$A_9$ and $C_5$–$C_9$ represent switching functions which are either true (one-set) or false (zero-set). When any switching function is true, current is passed into the corresponding positions of the trial and correction ladders. For example, if $A_0$ is true, the current $I_0$ flows in the summation ladder. Thus it is apparent that the trial voltage has 1024 discrete values, and that the correction volage has 32 discrete values.

It is also to be noted that the ladders of FIG. 6 can be used to accomplish binary code decimal conversion when $I_0$–$I_3$ are equal to $I_A$; $I_4$–$I_7$ are equal to $I_B$; and $I_8$–$I_{11}$ are equal to $I_C$. This of course would require two extra bit-stages in the trial summation ladder.

The corrected trial voltages, $E_{TC}$, would then be expressed as follows:

(23)
$$E_{TC}=R\left[I_A\left(A_0+\frac{A_1}{2}+\frac{A_2}{4}+\frac{A_3}{8}\right)+\frac{I_B}{16}\left(A_4+\frac{A_5}{2}+\frac{A_6}{4}+\frac{A_7}{8}\right)+\frac{I_C}{256}\left(A_8+\frac{A_9}{2}+\frac{A_{10}}{4}+\frac{A_{11}}{8}\right)\right]$$

Thus, if:
$$I_A=.1$$
$$\frac{I_B}{16}=.01$$
$$\frac{I_C}{256}=.001$$

then:
$I_A=.1$
$I_B=1.61I_A$
$I_C=2.56I_A$

Figure 11:
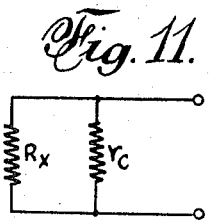

In order to convey the theoretical performance of the above discussion, relating to FIG. 8, to the prictical trial and correction ladders of FIG. 6, it is necessary to add the factor $\Delta$ to the resistance 2R to ground in FIG. 6. This is necessary because the Equation 9 assumes that ideal current sources of infinite impedance are employed. However, in the present embodiment the current sources in FIGS. 5 and 7 employ 2N1613 transistors which when operated at one milliamp have an output resistance, $r_c$, of 6.25 megohms. If the output resistance of the ladders is R=2560 ohms, then 2R=5120 ohms. In an effort to maintain the R, 2R relationship and thus closely approach the theoretical result indicated by Equation 9 it is necessary that the equivalent circuit of FIG. 11 be equal to 2R. But since $R_x$ must necessarily be larger than 2R, $\Delta$ is defined as:

(24) $\Delta=R_x-2R$

But:

(25) $2R=\frac{R_xr_c}{R_x+r_c}$ or $R_x=\frac{2Rr_c}{r_c-2R}$ substituting $R_x$ into Equation 24:

(26) $\Delta=\frac{4R^2}{r_c-2R}$ in general $r_c\gg 2R$, therefore:

(27) $\Delta\cong\frac{4R^2}{r_c}$ or using the above values:

(28) $\Delta\cong 4.26$ ohms

In the practical design of the trial ladder in FIG. 6, the operation of the current sources shown in FIGS. 5 and 7 can be best seen from the following discussion taken in view of FIG. 12. As shown here, the input voltage +6 volts corresponds to the zero-set condition. When the input flip-flop $A_1$, for example, is zero-set the diode $D_2$ will conduct causing approximately 1.5 milliamps to flow through the 3.9K input resistor $R_1$. At this time, diode $D_1$ will reverse bias, diode $D_3$ will conduct, thereby clamping point A to ground. It is to be noted that diode $D_4$ always conducts. The 1.5 miliamp current will divide, one milliamp going to any one of the current switches $I_0$–$I_9$ connected thereto and .5 milliamp going through the diode $D_3$. Clamping point A close to ground causes $r_c$ to be in parallel with $2R+\Delta$, therefore, the resistance looking between points $a$ and $b$ will be 2R. In this case, $r_c$ simulates the output resistance of the current source. Also, clamping point A to ground insures that the Thevinen equivalent between $a$ and $b$ is zero for the condition in question. If point A has not been returned to ground, diode $D_1$ will have large leakage and the impedance between $a$ and $b$ will be altered from 2R by a small amount since in general the resistance of a silicon diode is much greater than 6.25 megohms.

When an input flip-flop is one-set or at $-6$ volts, $D_1$ conducts, shorting out the 6.25 megohm resistor, $r_c$. Diodes $D_2$ and $D_3$ will be reverse biased at this time. The parallel combination $r_c$ (the output resistance of the current source) and $2R+\Delta$ will again yield a resistance of 2R. Thus, the theoretical Equation 9 may be achieved to the degree with which the output impedance of the current source is established.

The 6.25 megohm resistance in shunt with diode $D_1$ is not required in the correction ladder since the correction ladder resistance is much smaller than that of the trial ladder.

An important consideration in assuring dependable operation of the trial and correction ladders is stabilization of the current sources shown in FIGS. 5 and 7. The manner in which this is effected can be best shown with reference to the typical trial and correction current sources shown in FIG. 5.

In FIG. 5 the voltage, $-V_R$, from the current source negative reference supply circuit 60 is applied to the base of the transistor 61. The transistors 61 and 62 are selected to have matched emitter to base voltages which track within 5 microvolts per ° C. over a temperature range of $-55°$ C. to $100°$ C.; therefore the voltage $V_Z$ appears across the resistor 63. The emitter resistor 64 is selected so as to obtain a small base current in the transistor 62; therefore, the current through the resistor 65 is essentially the voltage $V_Z$ divided by the resistance value of the resistor 63. The transistors 66 and 67 provide a common base stage with alpha equal to or greater than .995. Therefore, the currents $I_0$ through $I_9$ become independent of temperature variations of transistors normally caused by variation of the base to emitter voltage and alpha with temperature. The configuration of the transistors 66 and 67 makes $I_0$ through $I_9$ independent of leakage current variations with temperature. The resistance 68 provides a means for supplying base current to the transistor 66 and collector current to the transistor 62 and in addition reverse biasing the collector to base junction of the transistor 66. The resistor 65 is employed to provide reverse biasing of the collector to base junction of the transistor 62. The reference voltage, $-V_R$, is supplied to each of the trial and correction current sources, except the bias unit.

The portion of the network of FIG. 5 heretofore described is utilized for supplying current to each of the stages of both the correction and trial summation ladders 52 and 55, respectively. In addition, the current sources utilized in conjunction with the trial summation ladder include the clamping network 68. This clamping network comprises the diodes 69 and 70 and the resistance 71 which function in the manner described in conjunction with $D_1$, $r_c$ and $(2R+\Delta)$ in the circuit shown in FIG. 12.

The current source negative reference supply shown in dashed lines 60 employs 8.4 volt Zener diode 72 whose temperature coefficient is .002 percent per degree centigrade when operated at 10 milliamps. The transistor 73, Zener diode 74, emitter resistor 75 and the base resistor 76 comprise a conventional current source to provide the fixed 10 milliamps through the diode 72 independent of 18 volt supply variations. The amount of current drawn away by the 15 current sources to which $-V_R$ is applied is constant and small compared to the current provided by the current source comprising the transistor 73. Compared to the conventional current source, such as 60 utilized in the bias current source of FIG. 7, the temperature stability of the current source shown in the dashed lines 77 of FIG. 5 is virtually perfect in relative performance.

The current source 77 and positive reference supply 60 of FIG. 7 perform in the same manner as described in conjunction with their counterparts in FIG. 5, the only difference being that the polarity of the output current $I_x$ is inverse to that of $I_0$ through $I_9$ and $I_{C5}$ through $I_{C9}$ which is effected by use of reverse polarity components as clearly shown in FIGS. 5 and 7.

In the present embodiment, the trial and correction summation ladders shown in FIG. 6 operate in a unipolar manner by virtue of each of the resistors, such as, $R+\Delta/2$, $2R+\Delta$, $R/m$ and $2R/m$ being connected to ground. It is to be pointed out that when these resistors are connected to a positive potential, such as indicated at $V_{bias}$ in FIG. 13, the D/A converter may operate in a bipolar manner. In such a case, a +5.120 volt supply would permit the encoding of a positively swinging analog input voltage rather than the negatively swinging input of the present embodiment. And it follows that an analog input voltage having both positive and negative polarities can also be encoded in its entirety provided each of the peak-to-peak swings does not exceed 5.12 volts. Altering resistor or current magnitudes, of course, may be used to effect digitizing signals having greater or lesser maximum bounded values.

By virtue of the above arrangement, the D/A converter operates in the following manner. Each of the flip-flops $A_0$–$A_9$ causes the respective bit position current sources $I_0$–$I_9$ to conduct into their associated summation ladders when their controlling flip-flops are one-set by the input logical circuit 51. When the various sources are turned on in this manner the resultant currents develop trial voltages in corresponding positions of the current to voltage summation ladder 52. The trial voltages developed at the output of the summation ladder are shown in the following table wherein the weight of each position is expressed in terms of the flip-flops controlling the particular positions.

|  | Millivolts |
|---|---|
| $A_0$ | 2560 |
| $A_1$ | 1280 |
| $A_2$ | 640 |
| $A_3$ | 320 |
| $A_4$ | 160 |
| $A_5$ | 80 |
| $A_6$ | 40 |
| $A_7$ | 20 |
| $A_8$ | 10 |
| $A_9$ | 5 |

It is to be understood that each digital word defined by the trial register may comprise any combination of these ten voltage values. The magnitude of the voltage expressed by each digital word depends upon the number of flip-flops that are conditionally zero-set by the output of the hysteresis difference amplifier and as previously stated, the trial register may develop 1024 different trial voltage values.

When the D/A converter is set to construct ten bit words defining each of the values of $e_s$ by suitable adjustment of a word selector switch or programmed word length input, to be described later, eleven bit times are generated by a bit counter. It is during these eleven bit times that the flip-flops $A_0$–$A_9$ are successively unconditionally one-set to develop the trial voltages listed above. The flip-flops are also conditionally zero-set, or allowed to remain in a one-set state according to the output of the hysteresis difference amplifier, each in the next bit times following being unconditionally one-set. The flip-flops are conditionally zero-set by the one-setting of the output flip-flop of the hysteresis difference amplifier 24 which is effected whenever the input to the difference amplifier 47 $(e_s-e_{tc})$ is positive; otherwise if the output of the hysteresis difference amplifier 24 is zero-set in response to the quantity $(e_s-e_{tc})$ being negative, the particular flip-flop turned on during the previous bit-time is left one-set. The eleventh bit-time is desginated $t_{eow}$ and corresponds to the next bit time after $t_9$, or arbgreement, Ag. This sequence of operation may be seen from the following table in which it is assumed that the trial voltages are generated to define a sample voltage of 75 millivolts and further assumes that no correction or bias voltage is present.

| Bit-Time | Flip-flops unconditionally one-set by logic | Flip-Flops conditionally zero-set by output of amp. 24 | $e_t$ (my.) | Digital word |
|---|---|---|---|---|
| $t_{eow}$ | $A_0$ |  | 2,560 |  |
| $t_0$ | $A_1$ | $\overline{A_0}$ | 1,280 | 0 |
| $t_1$ | $A_2$ | $\overline{A_1}$ | 640 | 0 |
| $t_2$ | $A_3$ | $\overline{A_2}$ | 320 | 0 |
| $t_3$ | $A_4$ | $\overline{A_3}$ | 160 | 0 |
| $t_4$ | $A_5$ | $\overline{A_4}$ | 80 | 0 |
| $t_5$ | $A_6$ | $\overline{A_5}$ | 40 | 0 |
| $t_6$ | $A_7$ | $A_6$ | 60 | 1 |
| $t_7$ | $A_8$ | $A_7$ | 70 | 1 |
| $t_8$ | $A_9$ | $A_8$ | 75 | 1 |
| $t_9$ |  | $A_9$ | 75 | 1 |

As previously mentioned, the correction register stores a correction voltage for the duration of each analog frame which is applied to each trial voltage developed by the trial summation ladder for each digital word of an analog frame. At the bit-time $t_9$ of the last word of an analog frame the correction register flip-flops $C_5$–$C_9$ are all zero-set so as to clear the correction register of the previous correcton voltage. During word, $W_0$, the trial register develops the correction voltage in the usual manner after the shorting switch 48 is turned on. At times of word $W_0$ the contents of the last five bits of the trial register are copied through the cabled connection 57 into the correction register where they remain until the next frame. During the generation of the correction voltage the output logical circuit 27 inhibits an output from the trial register.

The following table clearly shows the voltages that are developed in the trial ladder and corresponding correction voltage, $e_c$, that results. This table also includes the digitized form of the correction voltages in both the trial and correction registers.

| Last five bit-positions | | | | | $e_t$, mv. | Positive bias, $e_c = E_x$, mv. | $e_{to}$, mv. | $e_o$, mv. | Last five bit-positions | | | | |
|---|---|---|---|---|---|---|---|---|---|---|---|---|---|
| $A_5$ | $A_6$ | $A_7$ | $A_8$ | $A_9$ | | | | | $C_5$ | $C_6$ | $C_7$ | $C_8$ | $C_9$ |
| 1 | 1 | 1 | 1 | 1 | −155 | +77.5 | −77.5 | −77.5 | 1 | 1 | 1 | 1 | 1 |
| 1 | 1 | 1 | 1 | 0 | −150 | +77.5 | −72.5 | −72.5 | 1 | 1 | 1 | 1 | 0 |
| 1 | 1 | 1 | 0 | 1 | −145 | +77.5 | −67.5 | −67.5 | 1 | 1 | 1 | 0 | 1 |
| 1 | 1 | 1 | 0 | 0 | −140 | +77.5 | −62.5 | −62.5 | 1 | 1 | 1 | 0 | 0 |
| 1 | 1 | 0 | 1 | 1 | −135 | +77.5 | −57.5 | −57.5 | 1 | 1 | 0 | 1 | 1 |
| 1 | 1 | 0 | 1 | 0 | −130 | +77.5 | −52.5 | −52.5 | 1 | 1 | 0 | 1 | 0 |
| 1 | 1 | 0 | 0 | 1 | −125 | +77.5 | −47.5 | −47.5 | 1 | 1 | 0 | 0 | 1 |
| 1 | 1 | 0 | 0 | 0 | −120 | +77.5 | −42.5 | −42.5 | 1 | 1 | 0 | 0 | 0 |
| 1 | 0 | 1 | 1 | 1 | −115 | +77.5 | −37.5 | −37.5 | 1 | 0 | 1 | 1 | 1 |
| 1 | 0 | 1 | 1 | 0 | −110 | +77.5 | −32.5 | −32.5 | 1 | 0 | 1 | 1 | 0 |
| 1 | 0 | 1 | 0 | 1 | −105 | +77.5 | −27.5 | −27.5 | 1 | 0 | 1 | 0 | 1 |
| 1 | 0 | 1 | 0 | 0 | −100 | +77.5 | −22.5 | −22.5 | 1 | 0 | 1 | 0 | 0 |
| 1 | 0 | 0 | 1 | 1 | −95 | +77.5 | −17.5 | −17.5 | 1 | 0 | 0 | 1 | 1 |
| 1 | 0 | 0 | 1 | 0 | −90 | +77.5 | −12.5 | −12.5 | 1 | 0 | 0 | 1 | 0 |
| 1 | 0 | 0 | 0 | 1 | −85 | +77.5 | −7.5 | −7.5 | 1 | 0 | 0 | 0 | 1 |
| 1 | 0 | 0 | 0 | 0 | −80 | +77.5 | −2.5 | −2.5 | 1 | 0 | 0 | 0 | 0 |
| 0 | 1 | 1 | 1 | 1 | −75 | +77.5 | +2.5 | +2.5 | 0 | 1 | 1 | 1 | 1 |
| 0 | 1 | 1 | 1 | 0 | −70 | +77.5 | +7.5 | +7.5 | 0 | 1 | 1 | 1 | 0 |
| 0 | 1 | 1 | 0 | 1 | −65 | +77.5 | +12.5 | +12.5 | 0 | 1 | 1 | 0 | 1 |
| 0 | 1 | 1 | 0 | 0 | −60 | +77.5 | +17.5 | +17.5 | 0 | 1 | 1 | 0 | 0 |
| 0 | 1 | 0 | 1 | 1 | −55 | +77.5 | +22.5 | +22.5 | 0 | 1 | 0 | 1 | 1 |
| 0 | 1 | 0 | 1 | 0 | −50 | +77.5 | +27.5 | +27.5 | 0 | 1 | 0 | 1 | 0 |
| 0 | 1 | 0 | 0 | 1 | −45 | +77.5 | +32.5 | +32.5 | 0 | 1 | 0 | 0 | 1 |
| 0 | 1 | 0 | 0 | 0 | −40 | +77.5 | +37.5 | +37.5 | 0 | 1 | 0 | 0 | 0 |
| 0 | 0 | 1 | 1 | 1 | −35 | +77.5 | +42.5 | +42.5 | 0 | 0 | 1 | 1 | 1 |
| 0 | 0 | 1 | 1 | 0 | −30 | +77.5 | +47.5 | +47.5 | 0 | 0 | 1 | 1 | 0 |
| 0 | 0 | 1 | 0 | 1 | −25 | +77.5 | +52.5 | +52.5 | 0 | 0 | 1 | 0 | 1 |
| 0 | 0 | 1 | 0 | 0 | −20 | +77.5 | +57.5 | +57.5 | 0 | 0 | 1 | 0 | 0 |
| 0 | 0 | 0 | 1 | 1 | −15 | +77.5 | +62.5 | +62.5 | 0 | 0 | 0 | 1 | 1 |
| 0 | 0 | 0 | 1 | 0 | −10 | +77.5 | +67.5 | +67.5 | 0 | 0 | 0 | 1 | 0 |
| 0 | 0 | 0 | 0 | 1 | −5 | +77.5 | +72.5 | +72.5 | 0 | 0 | 0 | 0 | 1 |
| 0 | 0 | 0 | 0 | 0 | 0 | +77.5 | +77.5 | +77.5 | 0 | 0 | 0 | 0 | 0 |

Table header spans: $t = W_0 t_8$ (left section) and $t = W_0 t_9$ (right section).

It is to be noted in the table that the correction count 1–0–0–0–0 provides −2.5 millivolts correction and that the count 0–1–1–1–1 provides +2.5 millivolts correction. One of these two counts would occur if the analog ground and converter ground were identical and there were no converter temperature drift, offset, or other system voltage errors. Thus when the converter is encoding and the analog input voltage is zero, an all zero count would be yielded. This method of correction where there is practically no difference between the ground of the analog system and the above voltages of the converter system assures optimum linearity.

HYSTERESIS DIFFERENCE AMPLIFIER

The hysteresis difference amplifier 24, as previously described, comprises a four-stage direct coupled transistorized difference amplifier 47 having a field effect input transistor stage to preclude the drawing of current from the sampling capacitor 37 and subsequent diminution of the sampled voltage, $e_s$. In addition to the field effect input transistor stage the construction of the difference amplifier further includes a flip-flop control circuit 80. The circuit 80 is responsive to the output of the difference amplifier 47 to provide an output in accordance with the relative magnitudes of the sample voltage, $e_s$, with respect to the trial corrected voltages, $e_{tc}$, and controls the state of an output flip-flop 81. The output $E_D$, of the flip-flop 81 is connected by the lead 82 to the input logic 51 of the trial register, as may be seen in FIGS. 1 and 2. A feedback line 83 is coupled from the false side of the flip-flop 81 output back to the control circuit 80. The voltages $e_s$ and $e_{tc}$ are supplied to the input of the difference amplifier through leads 25 and 26, respectively. The output of the difference amplifier is coupled by the lead 84 to the input of the control circuit 80. Leads 85 and 86 are utilized to connect the output of the control circuit 80 in a conventional manner to the flip-flop 81. The lead 87 is utilized to provide delayed clock pulses, $C_D$, to the flip-flop control circuit 80.

The operation of the amplifier 24 is as follows. When the magnitude of the sample voltage, $e_s$, is greater than the trial voltage, $e_{tc}$, the output of $E_D$ of the amplifier 24 is false or "zero." If the magnitude of $e_s$ is less than $e_{tc}$ the amplifier output, $E_D$, will be true or "one." When the magnitude of $e_s$ is equal to $e_{tc}$ the output of the flip-flop 81 retains its previous state.

One function of the delayed clock is to allow the output, $e_{tc}$, of the summation network 52 of the D/A converter 23 to reach its final value, whether increasing or decreasing in magnitude, and to allow for the delay time of the difference amplifier 47. The feedback of line 83, when coupled to the control circuit 80 in the manner shown, provides a means whereby the flip-flop output is forced to remain in its previous state in the presence of noise generated in the difference amplifier 47 when the magnitudes of the input voltages, $e_s$ and $e_{tc}$, are approximately equal. The feedback of line 83 causes a noise rejection level to be set up in the control circuit 80 so that the output $E_D$ of the difference amplifier must exceed this rejection level before the state of the output flip-flop 81 can be altered. In this manner, this feedback technique provides a means of noise rejection unless the amplitude of the noise exceeds the bounds set up by the feedback loop. A further method of noise rejection is provided by the delayed clock pulses, $C_D$. The switch of the delayed clock pulses is narrow relative to that of a bit time. Therefore, not only must the noise exceed a given amplitude but must occur during this brief period of the delayed clock pulse. Although this does not entirely eliminate noise actuation of the flip-flop 81, it obviously substantially reduces the probability of such actuation, thereby enhancing the repeatability of the overall analog-to-digital conversion.

Since the flip-flop 81 has only two output states which change only upon the receipt of the delayed clock pulse by the control circuit 80, the trial register can only respond to these changes at system clock times rather than be subject to change due to transient voltages found objectionable in A/D converters employing comparators without hysteresis.

TIMING, PROGRAMMING AND CONTROL CIRCUITS

To effect proper time sequence of operation of the input circuit 22; D/A converter 23; correction and trial registers 50 and 53; and the hysteresis difference amplifier 24, the A/D converter also includes various timing, programming and control circuits. As shown in the block diagram of FIG. 1, these circuits basically comprise a mode programmer 88 formed by a flip-flop register 89 comprising flip-flops $M_1$ and $M_2$ which are controlled by the logical circuits or input logic 90; a bit counter 91 including a register 92 formed by four flip-flops $B_0$–$B_3$ whose set and reset states are controlled by the input logical circuits 93 and whose outputs are constructed into a maximum of eleven timing pulses $t_0$–$t_9$ and $t_{eow}$ by means of an output logical circuit 94; a word counter 95 formed by a register 96 formed by eight flip-flops $WD_0$–$WD_7$ which are controlled by an input logical circuit 97; means for controlling the length or number of bits of digital words formed by the A/D converter comprising a word length selector switch 98, a word length selector gate 99, and a terminal connection 100 for receiving control signals from an external word length programmer; and a clock system to provide clock pulses to the converter which comprises an internal clock 101, a clock selector gate 102, a clock driver 103, a clock pulse delay device 104 and a terminal connection 105 for receiving external clock pulses.

These circuits further include a sync selector switch 106; the sample control logical circuit 39, a frame marker gate 107, a complement forming circuit 108 comprising a complement flip-flop $X_{10}$ controlled by a complement logical circuit 109; a power supply for the converter comprising a power terminal 110, an internal multiple level power supply 111 and a power delay circuit 112; and terminal connections 113 and 114 to which external sources of a master reset, $M_R$, and an analog reset, $A_R$, pulses are connected when the converter is operated in its synchronous mode; and a shorting switch gate 177 for controlling shorting switch 48.

The interconnections of the above described circuits are represented in FIGS. 1 and 2 by various cabled connections. It is to be understood in the following description of these connections that each of the cables identified contains separate leads to provide circuit connection of the various timing, programming and control signals to the various components of the converter.

The clock selector gate 102 is manually set to connect either the internal clock 101 applied thereto through lead 115 or the external clock applied thereto from terminal 105 through lead 116 to a conventional clock driver 103 through lead 117. It is to be noted that the converter is asynchronously operated when the internal clock is utilized and synchronously operated when an external clock is utilized to derive the clock pulses.

The output of the clock driver 103, comprising clock pulses, $C_P$, is supplied to all flip-flops of the converter through the cabled connection 118 and to the conventional time delay circuit 104 through lead 119 to provide a delayed clock or strobe pulse, $C_D$, which is applied to the flip-flop control circuit 80 of the hysteresis difference amplifier 24 through lead 87, as previously described.

The word length selector switch may be manually set to provide an output comprising switch position signals $SW_5$–$SW_9$ indicative of the number of bits to be present in the digital words formed by the converter. These signals are connected to the word length selector gate 99 by the cable connection 120; to the cabled input connection 121 of the bit counter through connections 120 and 122; and to the cabled input connection 123 of the D/A converter to the input logic of the trial register through connections 120 and 124.

The switch signals may be derived as decribed above for either mode of operation of the converter. However, if described, these signals may be derived from an external source or programmer connected to terminal 100 and by means of the cabled lead 125 to the cable 120 and to the components set forth above. With such a source of these signals, the digital word lengths can be varied as desired for the purpose of weighting the digital word length with respect to the accuracy of the particular transducer, connected to the input terminal 20 or to effect scrambling for security purposes. It is to be understood that one of the five leads constituting the cable 120 will be true while the remaining four will be false.

The signals $SW_5$–$SW_9$ are combined by conventional logical techniques in the word length selector gate with timing signals derived from the bit counter to provide an output appearing in the cabled connection 126 defined as a true or false agreement term, $A_G$. This signal is supplied from the output cable 126 through connections 127 and 121 to the input logic of the bit counter; through connections 126, 127 and 128 to the input cable 129 of 127 and 121 to the input logic of the bit counter; through connections 126 and 130 to the input cable 123 of the D/A converter to the trial register input logic; and to the sample logic 39 and complement logic 109 through the cabled connection 126.

The sync selector switch 106 comprises a conventional transistorized switch that is adjustable to one of two positions to provide output signals termed $S_y$ or $\overline{S_y}$. These signals appear in the output cable 131 and are applied through connections 131 and 132 to the clock selector gate 102; through connections 131, 133 and 129 to the input logic of the mode programmer; through connections 131, and 121 to the input logic of the bit counter; through connections 131, 133, 134 and the cabled input 135 to the converter output logic 27; through leads 131, 133, 134, 136 and the cabled input 137 to the input logic of the word counter; through connections 131, 133, 134, 138 and the cabled input 139 to the complement logic 109; through connections 131 and 140 to the frame marker gate 107; and through connections 131, 140, 141 and the cable 123 to the input logic of the trial register; through connections 131, 140 and 179 to the shorting switch gate.

The output of the mode counter 88 is connected by the cabled output 142 and connections 143, 144 and 129 to the input logic of the mode counter; through connections 142, 143 and 121 to the input logic of the bit counter; through connections 142, 143, 144 and 139 to the complement logic; through connections 142, 143, 144, 145 and 135 to the output logic 27; through connections 142, 143, 144, 146 and 123 to the input logical circuits of the trial and correction registers; and through connections 142, 143, 144 and 147 to the frame marker gate 107.

The output of the word counter register 96 is connected through the cabled output 148 and connections 149 and 137 to the input logic of the word counter; through connections 148, 150 and 129 to the input logic of the mode programmer; and is available through connections 148, 150 and 151 for application to a multiplexer and the shorting switch gate 176. This multiplexer may be utilized to switch various transducers at selected word times to the input terminal 20 of the converter in a conventional manner.

The individual outputs of the bit counter flip-flops $B_0$–$B_3$ are connected through the cabled connection 152 to the bit counter output logic 94; and through connections 152, 153 and 121 to the input logic of the bit counter. The timing pulses $t_0$–$t_9$ and $t_{eow}$ developed in the output logic 94 of the bit counter are connected through the cabled output 154 and connections 155 and 123 to the input logic of the trial and correction registers; through connections 154, 155, 156, 153 and 121 to the input logic of the bit counter; through connections 154, 157 and 139 to the complement logic; through connections 154, 157, 158 and 135 to the output logic; through connections 154, 157, 159 and 129 to the input logic of the mode programmer; through connections 154, 155 and 160 to the sample logic; and through connections 154, 155, 160 and 161 to the word length selector gate 99; and through connection 154, 155, 160 and 178 to the frame marker gate.

The power signals $P_D$ and $\overline{P_D}$ derived from the delay circuit 112 are supplied through connections 162 and 121 to the input logic of the bit counter; through connections 162, 163 and 129 to the input logic of the mode programmer; and through connections 162, 163, 164 and 137 to the input logic of the word counter.

The master reset signal, $M_R$, connected to terminal 113 when the converter is operated synchronously, is applied to the bit counter input logic through the connections 165 and 121 and to the input logic of the word counter through connections 165, 167 and 137.

The analog reset signal, $A_R$, connected to terminal 114 during synchronous operation of the converter, is connected to the input logic of the bit counter through connections 169 and 121; and to the input logic of the mode programmer through leads 169, 170 and 129.

The output signal, $F_M$, from the frame marker gate is supplied to the input logic of the correction register through the lead 172.

In addition to the above connections, it to be pointed out that the outputs of the flip-flops $A_0$–$A_9$ of the trial register are supplied through the cable connection 173 to the input 135 of the A/D output logic; and the outputs of the flip-flops $A_5$–$A_9$ are supplied through the cable connection 174 to the input cable 139 of the complement logic, as shown in FIGS. 1 and 2.

The power supply for the A/D converter may be derived from an external battery or internal source depending upon the particular uses of the converter. As shown in the block diagram of FIG. 1, a 28 volt power supply is connected to a power terminal 110. In any event, the power is supplied through lead 175 to the power delay circuit 112 comprising a conventional capacitor which when sufficiently charged causes the input power logic term, $P_D$, to become true or of sufficient level to supply the components of the converter. As shown, the power supply includes an internal multiple level power supply 111 connected by the connection 176 to the lead 175 connecting the terminal 110 to the power delay circuit to provide various operating voltages to the converter. The supply 111 is of conventional design. Until the time $P_D$ becomes true, all action of the converter is inhibited and forced to a freeze state, to be described. This insures that the converter is supplied with proper or required internal voltages before operation commences.

The various timing, programming and control circuits of the A/D converter enumerated above will be described in terms of their function and in terms of the logical equations from which the circuit structure of the various logical circuits are derived. These logical equations are expressed in Boolean algebraic notation and are mechanized in a conventional manner familiar to one skilled in the art to which this invention pertains. In the preferred embodiment of the invention, the mechanization of these equations is effected in terms of conventional high speed low powered NAND and NOR gates; however, it is to be understood that the same operating performance can be obtained through the use of conventional high speed low powered AND and OR gates.

MODE PROGRAMMER

The mode programmer 88 comprises a flip-flop register 89 formed by the two bi-stable flip-flops, $M_1$ and $M_2$, whose true and false output states in conjunction with the true and false outputs from the sync selector switch 106 determine the various modes of operation of the converter in both its synchronous and asynchronous modes of operation. The signals $M_1$, $M_2$, $\overline{M_1}$ and $\overline{M_2}$ constituting the output states of these flip-flops are applied through the cabled output connection 142 to control the operation of the correction register 53, trial register 50, the output logical circuit 27, bit counter register 92, the input logic 90 of the mode programmer itself, and the frame marker gate 107. The output states of the flip-flops $M_1$ and $M_2$ in combination with true and false states $S_Y$ and $\overline{S_Y}$ of the sync selector switch 106 combine to define eight different modes of operation of the converter. These different modes may be followed more clearly with reference to the Veitch diagram shown in FIG. 14. The different modes of the converter are listed in the following table wherein those modes designated 1A–4A relate to the asynchronous mode of operation of the converter and those designated 1S–4S relate to the synchronous mode of operation.

| Asynchronous Operation | Synchronous Operation |
|---|---|
| 1A $M_1 \overline{M_2} S_Y$ (Freeze) | 1S $M_1 \overline{M_2} S_Y$ (Freeze) |
| 2A $\overline{M_1} \overline{M_2} \overline{S_Y}$ (Barker word and ground encoding) | 2S $\overline{M_1} M_2 S_Y$ (ground encoding) |
| 3A $\overline{M_1} M_2 \overline{S_Y}$ (1010 pattern) | 3S $M_1 M_2 S_Y$ (Analog encoding) |
| 4A $M_1 M_2 \overline{S_Y}$ (Analog encoding) | 4S $\overline{M_1} \overline{M_2} S_Y$ (Illegal) |

The output states of the flip-flops $M_1$ and $M_2$ are controlled in accordance with the following input logic upon which the construction of the mode programmer input logical circuits 90 is based.

MODE PROGRAMMER INPUT LOGIC $1^{M_1} = \overline{P}_D + \overline{S}_Y \overline{M}_1 M_2 t_9 + \overline{M}_1 t_8 S_Y$
$0^{M_1} = W_{255} P_D (t_9 + A_G)$
$1^{M_2} = \overline{S}_Y \overline{M}_1 \overline{M}_2 t_9 + A_R S_Y t_9 + W_{255} P_D S_Y (t_9 + A_G)$
$0^{M_2} = \overline{P}_D + \overline{S}_Y W_{255} (t_9 + A_G) P_D + \overline{M}_1 t_8 S_Y$ While the mechanization of the above Boolean equations to obtain the structure of the input logical circuit 90 is accomplished by conventional techniques well-known in the art to which this invention pertains, the portion of the mode programmer input logic set forth above for "one-setting" flip-flop $M_1$ is shown in FIG. 15. This circuit is shown for the sake of simplicity in terms of conventional high speed low powered AND and OR gates and comprises an AND gate 180 which is supplied with the signals $\overline{S}_Y \overline{M}_1 M_2$ and $t_9$ through connections 133, 144 and 159 to the input cable 129 of the input logic 90 as shown in FIG. 1. This circuit further includes an AND gate 181 which is similarly supplied at its input with the $\overline{M}_1 t_8$ and $S_Y$ signals and an OR gate 182. The input of the OR gate 182 is connected by leads 183 and 184 to the outputs of the AND gates 180 and 181, respectively, and is further supplied with the $\overline{P}_D$ signal through connection 163 as shown in FIG. 1. With the above arrangement, when either of the AND gates 180 and 181 receives all of the signals at their respective inputs or when the false power signal, $\overline{P}_D$, is supplied through the connection 163 a signal will be emitted from the OR gate 182 through lead 185 to "one-set" the flip-flop $M_1$ on the next clock pulse. The remaining equations for "zero-setting" the flip-flop $M_2$ are similarly mechanized. All remaining logical circuits included in this disclosure will be expressed in terms of Boolean equations and mechanization of these equations will be omitted for simplicity.

The Veitch diagram shown in FIG. 14 shows the eight possible modes of operation of the converter. When the power is turned on and the converter is in the *asynchronous mode*, flip-flop $M_1$ will be forced "true" and the flip-flop $M_2$ will be formed "false" due to $\overline{P}_D$ coming true. This forces the bit counter to count $t_9$ and the word counter to $W_{255}$. On the next clock pulse after $P_D$ comes true, $M_1$ goes "false" since $P_D W_{255}(t_9)$ is true, and remains in this state for two word times. During period $W_0$ and $W_1$, the Barker word and the 1010 pattern are generated in conjunction with the bit counter. One bit time prior to the end of the Barker word, $M_2$, which has previously been "false," is one-set by the term $\overline{M}_1 \overline{M}_2 \overline{S}_Y t_9$; thus in each frame, $M_1$ is false for two word times, and $M_2$ is false for one word time, after power is initiated. $M_1$ is one set when the logic term $\overline{M}_1 M_2 \overline{S}_Y t_9$ occurs thereby causing the analog encoding mode. The mode $\overline{M}_1 \overline{M}_2 \overline{S}_Y$ is reinitiated upon the occurrences of $$\overline{S}_Y W_{255}(t_9 + A_G) P_D$$

The operation of the mode flip-flops in the *synchronous mode* is as follows. The initial freeze state is obtained by the previously described condition of $M_1 \overline{M}_2 S_Y$ which is caused by $\overline{P}_D$. When $P_D$ comes true the mode flip-flops will go to $\overline{M}_1M_2S_Y$ since the logic term $P_DW_{255}t_9$ will be true. This causes the converter to go through the ground encoding routine in the manner previously described in conjunction with the trial register and Col. III of FIG. 16. At the end of this routine the logical term $\overline{M}_1t_8S_Y$ will occur causing the freeze mode $M_1\overline{M}_2S_Y$. Upon receipt of an $A_R$ pulse the term $A_RS_Yt_9$ will be true which will cause $M_1M_2S_Y$, the analog encoding mode. This mode will continue until either $W_{255}$ is reached or $M_R$ occurs causing the word counter to go to $W_{255}$. Upon the occurrence of $P_DS_YW_{255}(t_9+A_G)$ the converter will go to the ground encoding mode $\overline{M}_1M_2S_Y$ and then to the freeze state $\overline{M}_{12}\overline{M}S_Y$ due to $\overline{M}_1t_8S_Y$. The unit remains in this state until another $A_R$ is received. The function of $M_R$ is to cause the converter to halt without going through all possible word times. $M_R$ may occur any time between word one and $W_{255}$.

This start/stop feature allows the controlling sources to insert digital data at the controller's discretion and then resume encoding analog information as required.

BIT COUNTER

The bit counter is necessary to provide timing pulses $t_0$–$t_9$ and $t_{eow}$ (see FIG. 16) which are required to control the time sequence of operation of the trial register 50, correction register 53, sample logical circuit 39, mode programmer 88, word counter 96, output logic 27 and the complement flip-flop $X_{10}$. The input logical circuits 93 controls the one-setting and zero-setting of the flip-flops $B_0$–$B_3$ forming the bit counter register 92 and is derived from the mechanization of the following logical equations.

BIT COUNTER INPUT LOGIC $1^{B0} = \overline{B}_1\overline{B}_0B_A\overline{A}_G + B_3\overline{B}_2B_1\overline{A}_G$
$0^{B0} = B_0(P_DM_RS_Y + P_D\overline{S}_Y + \overline{M}_1 + A_R + M_2)$
$1^{B1} = B_0(P_DM_RS_Y + P_D\overline{S}_Y + \overline{M}_1 + M_2 + A_R)$
    $+ M_1M_2S_Yt_0(SW_6+SW_9) + A_G$
$0^{B1} = B_1\overline{A}_G$
$1^{B2} = \overline{B}_2B_1 + \overline{P}_D + \overline{M}_1M_2S_Yt_0(SW_6+SW_7+SW_8) + A_G$
$0^{B2} = B_2B_1\overline{A}_G$
$1^{B3} = \overline{B}_3B_2B_1 + \overline{P}_D$
$0^{B3} = B_3B_2B_1$ where:

$$B_A = \overline{SW_6}\overline{SW_8}\overline{SW_9} + \overline{S}_Y + \overline{t}_0 + M_1 + \overline{M}_2$$

The input logical circuit 93 operates through the flip-flops $B_0$–$B_3$ in conjunction with the output logical circuits 94 to provide an output from the bit counter comprising the timing pulses $t_0$–$t_{eow}$ in the proper sequences required for the converter to construct six to ten bit digital words plus complement bit, and the eleven bits necessary for the counter to compose the Barker and 1010 pattern sync-words.

The output logical circuits of the bit counter is constructed in accordance with the following logical equations.

BIT COUNTER OUTPUT LOGIC $t_0 = \overline{B}_3\overline{B}_2\overline{B}_1\overline{B}_0$
$t_1 = \overline{B}_3\overline{B}_2B_0$
$t_2 = \overline{B}_3\overline{B}_2B_1$
$t_3 = B_2\overline{B}_1\overline{B}_0$
$t_4 = \overline{B}_3B_2B_0$
$t_5 = \overline{B}_3B_2B_1$
$t_6 = B_3\overline{B}_1\overline{B}_0$
$t_7 = B_3\overline{B}_2B_0$
$t_8 = B_3\overline{B}_2B_1$
$t_9 = B_3B_2\overline{B}_1$ $$t_{eow} = B_3B_2B_1$$

The bit counter counts in a modified binary fashion and ordinarily would be capable of counting $2^4$ or 16 counts; however, in order to allow maximum flexibility and reduction of components the counts corresponding to 3, 7, 11, 12 and 15 have been excluded. These excluded counts are termed illegal counts and it can be conventionally shown that the counter would automatically step to legal counts within two counts in the event malfunction should cause the generation of any of the above illegal counts. Hence, when the converter is operated in either mode and an illegal count occurs, the counter will in one or two counts restore itself to the legal counting sequence and no more than one digital word would be affected. The table shown in FIG. 16 shows the binary representation of the legal counts attainable from the counter register in their relation to the bit-times $t_0$–$t_9$ and $t_{eow}$. The table also shows the manner in which the counts are utilized when encoding in the synchronous or asynchronous modes for word lengths of six to ten bits, see Col. I. Col. II shows the ground encoding counting (Barker word) and 1010 pattern sequences for asynchronous operation of the converter. Col. III shows the counts occurring during ground encoding and the converter is synchronously operated.

It is to be noted with respect to Col. I, that the last count $t_{eow}$ is the same independent of word length. It is also seen that a ten bit encoding requires eleven bit times. As indicated by the arrows identified $SW_6$, $SW_7$, $SW_8$ and $SW_9$ associated with the counting sequences for encoding, six to nine bit digital words jump to $t_{eow}$ at the last count of each word length. The counting sequence or number of bits, as previously mentioned, is determined by the input logic of the bit counter in response to the presence of the $SW_6$ to $SW_9$ switching signals derived from the word length selector switch for six to nine bit words and the absence of such switching signals for ten bit words. These inputs can be randomly mixed when external selection of word length is effected by means of a programmer in lieu of switch 98 in the synchronous mode.

Col. II shows the counting sequence of eleven bit times utilized during words $W_0$ and $W_1$ when the converter is in the ground encoding mode, generating a Barker word and a 1010 pattern while operated in the asynchronous mode. Even though the bit times may vary from seven to eleven bits for the analog encoding of six to ten bit digital words as indicated in Col. I, a constant of eleven bit times is always required during the words $W_0$ and $W_1$ to permit the development of the eleven bit Barker word and the 1010 pattern. This is effected in conjunction with the input logic of the bit counter by the presence of the signals supplied from the mode flip-flops $M_1$ and $M_2$ and the false sync signal, $\overline{S}_Y$.

The Barker word is for the purpose of frame identification by the utilizing equipment in accordance with standard techniques and is selected because it constitutes the least probable arrangement of an eleven bit word. Similarly, the word used to synchronize, or lock-on, the utilizing equipment clock with the converter clock, 101, is the 1010 pattern, also constituted by eleven bit times.

Col. III identifies the counting sequences utilized for the various word lengths when ground encoding is being effected while the converter is operated synchronously.

It is to be noted that in order to effect the maximum accuracy allowable from the correction network, it is necessary that the counting sequences for the various word lengths be effected in the orders indicated in conjunction with the arrows identified by the switching signals $SW_6$ to $SW_9$ for six to nine bit words and sequentially from $t_0$ to $t_{eow}$ for ten bit word encoding.

WORD COUNTER REGISTER

The word counter register 96 is an eight flip-flop counter which simply counts the number of digital words formed by the converter at the command of the input logical circuit 97. The word counter advances to the next word count at the end of $t_{eow}$ of each digital word. The set and reset equations from which the input logic circuits 97 are mechanized are as follows. The clocking for this counter occurs only at the trailing edge of $t_{eow}$.

WORD COUNTER INPUT LOGIC

Where:

$W_A = WD_0 WD_1 WD_2$ $1^{WD_0} = \overline{WD}_0 + \overline{P}_D + M_R$
$1^{WD_1} = WD_0 \overline{WD}_1 + \overline{P}_D + M_R$
$1^{WD_2} = WD_0 WD_1 \overline{WD}_2 + \overline{P}_D + M_R$
$1^{WD_3} = W_A \overline{WD}_4 (\overline{M}_R + \overline{S}_Y)$
$1^{WD_4} = W_A \overline{WD}_3 + \overline{P}_D + M_R$
$1^{WD_5} = W_A W_B \overline{WD}_6 (\overline{M}_R + \overline{S}_Y)$
$1^{WD_6} = W_A W_B W_5 + \overline{P}_D + M_R$
$1^{WD_7} = W_A W_B \overline{WD}_5 WD_6 \overline{WD}_7 + \overline{P}_D + M_R$ $W_B = WD_3 WD_4$ $0^{WD_0} = WD_0 (\overline{M}_R + \overline{S}_Y)$
$0^{WD_1} = WD_0 WD_1 (\overline{M}_R + \overline{S}_Y)$
$0^{WD_2} = W_A (\overline{M}_R + \overline{S}_Y)$
$0^{WD_3} = W_A WD_4 + \overline{P}_D + M_R$
$0^{WD_4} = W_A \overline{WD}_3 (\overline{M}_R + \overline{S}_Y)$
$0^{WD_5} = W_A W_B WD_6 + \overline{P}_D + M_R$
$0^{WD_6} = W_A W_B \overline{WD}_5 (\overline{M}_R + \overline{S}_Y)$
$0^{WD_7} = W_A W_B \overline{WD}_5 WD_6 WD_7 (\overline{M}_R + \overline{S}_Y)$ The last count of the word counter as defined by the above logical equations is count number 255 or $W_{255}$. This count is utilized both in the input logic for the mode flip-flops and in the shorting switch gate and effects an output of the mode programmer utilized to actuate the frame marker gate in conjunction with the sync signals derived in the sync switch 106. It should be noted the $\overline{P}_D$ sets or resets the above fli-flop by D.C. control and therefore does not require the trailing edge of $t_{eow}$ for control. It should be noted that $W_{255}$ does not correspond to the binary number 255.

WORD LENGTH SELECTOR SWITCH

The word length selector switch 98 of this embodiment of the invention comprises a conventional manually adjustable transistorized switch having switching positions $SW_6$ through $SW_9$ that are initially set, prior to operation of the converter, to select the desired word lengths of six to ten bits for the digital words to be defined by the converter. The outputs of this switch are connected by lead 120 to the word length selector gate 99, through the cabled connections 122 and 121 to the input logic of the bit counter, and through the connections 124 and 123 to the input logic of the trial register.

WORD LENGTH SELECTOR GATE

The word length selector gate 99 comprises a plurality of NAND gates conventionally arranged to provide an output derived from the switching signal received through lead 120 and time signals received through the lead 161. This output constitutes either a true or false agreement term which occurs only when the converter is operated in the analog encoding mode for digital words of six to nine bits and is defined as follows.

$A_G = (SW_6 t_5 + SW_7 t_6 + SW_8 t_7 + SW_9 t_8) M_1 M_2 P_D$

The output of this gate is utilized to force the bit counter to count in the different sequences described in conjunction with Col. I and III of FIG. 16. This term is also utilized in the trial register logic, the complement logic, and the input logic of the mode programmer.

CONTROL CLOCK SYSTEMS

During asynchronous operation of the converter, the internal clock pulses $C_P$ and the delayed strobe pulses $C_D$ are derived from a conventional timing oscillator 101. During synchronous operation, these pulses are derived from an external timing device connected to the terminal 105. Also, when the converter is operated synchronously, master reset and analog reset pulses are received through terminals 113 and 114, respectively. When the master reset signal comes true, ground encoding occurs following $W_{255}$. The function of the analog reset signal is to remove the converter from the free condition following ground encoding and force it into the analog encoding mode.

FRAME MARKER GATE AND SHORTING SWITCH CONTROL

The frame marker gate 107 comprises a conventional logical circuit formed by NAND gates which issues a frame marker pulse, $F_M$, upon receipt of either of the groups of signals included in the following logical equations defining the output of this gate.

$$F_M = (\overline{M}_1 \overline{M}_2 \overline{S}_Y + \overline{M}_1 M_2 S_Y) t_{eow}$$

The input signal groups $\overline{M}_1 \overline{M}_2 \overline{S}_Y t_{eow}$ and $\overline{M}_1 M_2 S_Y t_{eow}$ are received by the gate at the end of $W_{255}$ for asynchronous and synchronous modes of operation, respectively, through the connections 140, 147 and 178. $F_M$ is connected by the lead 172 to the input logic of the correction register to zero-set the correction register flip-flops $C_5$ through $C_9$ at the beginning of each frame. This erases the correction voltage of the previous frame so that it will not be present to affect the correction voltage as it is normally encoded through the trial summation ladder of the trial register portion of the D/A converter.

As previously indicated, the encoding of the correction voltage is initiated by the closing of the shorting switch 48 at the beginning of each frame. In the illustrated form of the present invention the operation of the shorting switch is under the control of the shorting switch gate 177. In this regard the gate 177 is constructed in accordance with the following logical equation to selectively operate the swtich 48 and has the cables 151 and 179 connected to its input terminals.

$$SW = W_{255} + W_0 \overline{S}_Y$$

where:

SW is the gate triggering signal
$W_0 = \overline{WD}_7 \overline{WD}_6 \overline{WD}_5 \overline{WD}_4 \overline{WD}_3 \overline{WD}_2 \overline{WD}_1 \overline{WD}_0$
$W_{255} = WD_7 WD_6 \overline{WD}_5 WD_4 \overline{WD}_3 WD_2 WD_1 WD_0$

SAMPLE LOGIC

The sample logical circuit 39 is required to trigger the sample-and-hold circuit 30 of the input circuit which is effected by the output circuit 39 through the lead 38 in response to receipt of either the agreement term or the bit time signal $t_9$. These inputs will assure that a new sample of the analog input voltage is effected for each digital word formed by the converter.

COMPLEMENT LOGIC

To assure that every digital word formed by the converter comprises at least one bit change, the output of the trial flip-flops is utilized to set or reset the complement flip-flop $X_{10}$ during $t_{eow}$ at the end of each digital word regardless of the number of bits constituting the digital word. This is done to accommodate the devices utilizing the output of the converter.

In order to assure this change, the input logical circuit 109 of this flip-flop is constructed in accordance with the following logical equation to provide proper one-setting and zero-setting of the flip-flop $X_{10}$.

$1^{X_{10}} = \overline{A}_9 t_9 M_1 + A_G (\overline{A}_8 + \overline{A}_7 + \overline{A}_6 + \overline{A}_5) + \overline{M}_1 M_2 t_9$
$0^{X_{10}} = t_1$

TRIAL REGISTER INPUT LOGIC

The logical circuit 51 for controlling the flip-flops $A_0$–$A_9$ of the trial register of the D/A converter is mechanized in accordance with the following equations.

$1^{A_0}=t_9+A_G$
$0^{A_0}=E_D t_{eow}$
$1^{A_1}=t_{eow}M_1$
$0^{A_1}=E_D t_0+t_9+A_G$
$1^{A_2}=t_0 M_1$
$0^{A_2}=t_9+A_G+E_D t_1$
$1^{A_3}=t_1 M_1$
$0^{A_3}=t_9+A_G+E_D t_2$
$1^{A_4}=t_2 M_1$
$0^{A_4}=t_9+A_G+E_D t_3$
$1^{A_5}=t_3 M_1+SW_6 t_{eow}\overline{M_1}S_Y+t_3\overline{M_2}\cdot\overline{M_1}+S_Y t_3+SW_7 t_0\overline{M_1}S_Y$
$0^{A_5}=t_9+A_G+E_D t_4+SW_6 t_0\overline{M_1}S_Y E_D$
$1^{A_6}=t_4 M_1+SW_6 t_0\overline{M_1}S_Y+t_4\overline{M_2}\cdot\overline{M_1}+S_Y t_4$
$0^{A_6}=t_9+A_G+E_D t_5$
$1^{A_7}=t_5 M_1\overline{SW_6}+t_5\overline{M_1}(\overline{M_2}+S_Y)$
$0^{A_7}=t_9+A_G+E_D t_6$
$1^{A_8}=t_6\overline{SW_7}M_1+t_6\overline{M_1}(\overline{M_2}+S_Y)$
$0^{A_8}=t_9+A_G+E_D t_7$
$1^{A_9}=t_7 M_1\overline{SW_8}+t_7\overline{M_1}(\overline{M_2}+S_Y)$
$0^{A_9}=t_9+E_D t_8$ As previously described, the logical circuit 51, constructed from the above equations, performs to both conditionally and unconditionally set and reset the flip-flops $A_0$–$A_9$.

CORRECTION REGISTER LOGIC

As previously described, the correction register maintains a correction voltage developed by the trial register at the beginning of each encoding cycle. In the asynchronous mode, this occurs during the transmission of the Barker sync-word, and in the synchronous mode, it occurs as a result of a true master reset pulse coming true from the external control system or $P_D$. The correction register is cleared of its previous correction voltage just prior to the start of a new frame by the $F_M$ pulse by the resetting of each of the flip-flops $C_5$ through $C_9$ to their zero-set states. At bit time $t_9$, after the correction voltage has been developed by the trial register, the contents of the last five trial register flip-flops $A_5$ through $A_9$ is shifted into the correction register. This value will remain in the correction register for the duration of the frame and be superimposed on the regularly developed trial voltages developed by the trial register in digitizing each value of $e_s$.

Control of the flip-flops of the correction register is effected by the correction input logic circuit whose construction is effected in accordance with the following logical equations.

$0^{C_5}-C_9=F_M$
$1^{C_5}=A_5 t_8(S_Y\overline{M_1}+\overline{M_1 M_2})$
$1^{C_6}=A_6 t_8\overline{M_1}(S_Y+\overline{M_2})$
$1^{C_7}=A_7 t_8\overline{M_1}(S_Y+\overline{M_2})$
$1^{C_8}=A_8 t_8\overline{M_1}(S_Y+\overline{M_2})$
$1^{C_9}=E_D t_8(S_Y\overline{M_1}+\overline{S_Y M_1 M_2})$

OUTPUT LOGIC

As previously described, the digitized output, $E_{A/D}$, is effected by the logical output circuit 27. This circuit is mechanized in accordance with the following logical equation.

$E_{A/D}=M_1(A_0 t_0+A_1 t_1+A_2 t_2+A_3 t_3+A_4 t_4$
$+A_5 t_5+A_6 t_6+A_7 t_7+A_8 t_8+A_9 t_9+X_{10} t_{eow})$
$+\overline{M_1}M_2 S_Y(t_0+t_1+t_2+t_6+t_9)$
$+\overline{M_1}M_2\overline{S_Y}(t_0+t_2+t_4+t_6+t_8)$ The first expression of this equation satisfies the conditions necessary to provide the output of the trial flip-flops $A_0$–$A_9$ during normal encoding regardless of the word length and provides the necessary signals to effect a change in the last bit of each word as commanded by the complement flip-flop $X_{10}$. The second and third expressions are necessary to gate the proper bit time pulses out of the converter to form the Barker word and 1010 pattern, respectively.

A/D CONVERTER OPERATION

The operation of the A/D converter will be described for the asynchronous and synchronous mode of operation.

ASYNCHRONOUS MODE OF OPERATION

When the A/D converter is operated asynchronously, the sync-selector switch 106 is preset in its asynchronous position to continuously supply the signal $\overline{S}_Y$ through the output cable 131 to the input logical circuits of the mode programmer, bit counter, word counter, and correction register; frame marker gate; shorting switch gate; and to the output logical circuit of the converter. The internal clock 101 is connected through the clock gate 102 to the clock driver 103 and delay circuit 104 thereby presenting clock pulses $C_P$ to all flip-flops, except the word counter, of the converter and the delayed clock pulse $C_D$ to the control circuit 80 of the hysteresis difference amplifier.

Assume the word length selector switch 98 positioned for an eight bit digital word. Until the power delay circuit 112 becomes true, the word counter is commanded to $W_{255}$ as can be seen from the logical equations defining the input logic 97. The shorting gate 177 is energized by the term $W_{255}$ thereby closing the shorting switch 48. During this time the bit counter goes to $t_9$, and the sample logic 39 closes the sample and hold circuit 30. This develops a sample voltage, $e_s$, indicative of the difference between the A/D converter and analog system ground potentials. Due to $t_9$ coming true on the next clock pulse the trial register flip-flop $A_0$ is one-set and $A_1$–$A_9$ zero set.

After a preset time, greater than four bit-times, the power $P_D$ comes true. This logic term can occur only on a clock pulse, since it is mechanized with a flip-flop gated by $C_P$. On the next clock pulse after $P_D$ comes true, the following conditions are simultaneously effected. The bit counter increases one count to $t_{eow}$; and the mode programmer flip-flop $M_1$ goes false because of the $P_D\overline{S}_Y W_{255}t_9$ state pulse being applied to the input logic 90. This places the mode programmer in the $\overline{M_1 M_2}S_Y$ state corresponding to 2A in FIG. 14, and permits ground encoding and transmission of a Barker sync-word directly from the bit counter through the output logic 27. Since $\overline{M_1 M_2}S_Y t_{eow}$ is true, the logic term $F_m$ is true and the correction register flip-flops $C_5$–$C_9$ are zero set on the next clock pulse.

At the end of $t_{eow}$ the word counter advances to $W_0$. During $W_0$ word time the bit counter counts in its normal eleven bit sequence $t_0$–$t_{eow}$ regardless of the setting of the switch 98. Also during this period a Barker word is gated out by the output logic circuit as determined by the terms $\overline{M_1}M_2 S_Y(t_0+t_1+t_2+t_6+t_9)+t_{eow}X_{10}$, and the flip-flops of trial register are conditionally set to the one-set and zero-set states defining the correction voltage in accordance with the encoding process previously described. At the beginning of $t_9$ the contents of the trial register flip-flops, $A_5$–$A_8$ and the last bit of the correction occurring at this time at the output of the hystersis difference amplifier, $E_D$, are copied into the correction register as determined by the correction input logical equations.

Following $t_9$ of $W_0$, the mode programmer is changed to the $\overline{M_1}M_2$ state as defined by the mode logic term $\overline{M_1}M_2 S_Y t_9$, establishing the $\overline{M_1}M_2\overline{S}_Y$ state state identified as 3A in FIG. 14. In this mode the bit counter counts are transmitted by the output logic by the term $\overline{M_1}M_2\overline{S}_Y(t_0+t_2+t_4+t_6+t_8)+t_{eow}X_{10}$ This occurs during $W_1$.

At the end of $W_1$, the mode flip-flop $M_1$ is one-set following the occurrence of $t_9$ from the bit counter, thereby conditioning the mode programmer to the state $M_1 M_2\overline{S}_Y$ required for normal analog encoding which occurs during the next word lengths $W_2$–$W_{255}$. Also at the beginning of $t_{eow}$ the first flip-flop $A_0$ of the trial register is one-set and flip-flops $A_1$–$A_9$ are zero-set.

In the present case of an eight-bit word, at $t_7$ of $W_1$ the agreement term $A_G$ derived in the word selector gate 99 causes the bit counter to jump from count $t_7$ to $t_{eow}$. This procedure is also effected at $t_5$ for a six-bit word, at $t_6$ for a seven-bit word, at $t_7$ for an eight-bit word, at $t_8$ for a nine-bit word, and as previously described, at $t_9$ for a ten-bit word. Notice that the term $A_G$ is not dependent upon whether the converter is operated synchronously or asynchronously.

SYNCHRONOUS MODE OF OPERATION

The synchronous mode of operation of the converter differs from the asynchronous mode described above in that the operation of the converter is time controlled by the clock pulses $C_X$ which are derived from an external clock connected to terminal 105. In this mode, no syncwords are transmitted; however, the analog encoding cycle is controlled by the externally applied analog reset pulse connected to terminal 114 and the ground encoding cycle by the master reset pulse connected to terminal 113. In describing this mode of operation it is assumed that the sync-selector switch is set in the synchronous position, and power is off.

Upon the application of power, which may again be internally or externally provided, the power delay circuit 112 causes $P_D$ to remain false for a preset time. Prior to $P_D$ becoming true, the mode flip-flops $M_1$ and $M_2$ are one-set and zero-set, respectively, establishing the condition $M_1\overline{M_2}S_Y$ corresponding to the freeze mode IS shown in FIG. 14. This also causes the bit counter to advance to the freeze state or count $t_9$ and the word counter to go to $W_{255}$. $W_{255}$ causes the shorting gate to close the shorting switch. The occurrence of $t_9$ during the freeze mode causes the sample-and-hold circuit to develop a sample voltage from the $E_{AG}$ input, as previously described in the asynchronous mode.

One clock pulse $P_D$ comes true after the bit counter advances to $t_{eow}$ and $\overline{M_1}M_2S_Y$ becomes true causing the ground encoding mode 2S and $F_M$ to also become true thereby clearing the correction register on the next clock pulse. The converter then automatically encodes ground and then returns to the freeze state.

At bit time $t_9$ during $W_0$ after ground encoding has been effected, the correction voltage is transferred to the correction ladder by the appropriate setting of the flip-flops $C_5$–$C_9$ in the same manner previously described. The converter remains in the freeze state until an analog reset signal, $A_R$, is received at terminal 114. This causes the flip-flop $M_1$ of the mode programmer to be one-set, thus establishing the analog encoding mode $M_1M_2S_Y$ corresponding to 3S in FIG. 14.

It is to be noted that the converter is maintained in the freeze state after ground encoding until the $A_R$ pulse is received. In the event this period is of long duration, a new correction voltage may be established in one word time prior to transmission of the $A_R$ pulse to command analog encoding by merely preceding the $A_R$ pulse with an $M_R$ pulse. This procedure also provides control means whereby the synchronizing system may command the converter to repeat the above cycle whenever desired regardless of how many digital words have been formed in a frame.

The term $M_R$ commands the ground encoding mode by forcing the word counter to $W_{255}$. The term $A_R$ always commands analog encoding. The ground encoding always occurs during $W_0$. For word lengths less than the maximum the bit counter is jumped during $W_0$ to insure that a full five bit correction is performed independent of the word length selected. This feature is not necessary in the asynchronous mode since the Barker word occupies a full eleven bits.

If a time period equal to $W_{255}$ elapses without receiving an $M_R$ pulse, then the converter automatically goes to the ground encoding mode at $W_0$ and then into the freeze state. Under external control the position of $M_R$ may occur in any of the 255 analog words thus establishing the number of words in a frame. The length of each word may be externally controlled by causing any one of the lines $SW_6$ to $SW_9$ to come true. The flexibility of the converter under such external control is virtually unlimited. Occurrence of $W_0$ may be used to gate out other digital patterns such as those required for synchronization or other digital information as may be appearing from shaft encoders or from a digital computer. The maximum duration of $W_0$ may be whatever the external system commands, but should be longer than five bit times to allow for the correction to appear.

From the foregoing, it is apparent that the present invention provides an A/D converter having great flexibility of operation wherein the sampled analog input voltages are held throughout the process of successive approximations while each digital word representative of the sample is being formed; and wherein the digital words of each frame include a correction component compensating for differences between the ground potentials of the analog input systems and the converter and for drifts within the converter. The present converter also includes a hysteresis comparator and includes means whereby the bits comprising a digital word may be varied. It is also apparent that the present invention provides a converter that may be operated either asynchronously or synchronously. Also, the present converter is constructed from circuits employing only solid state silicon components and requiring low power for high speed operation, thereby extending the environmental range of the converter, especially in view of the correction means which precludes appreciable errors resulting from temperature caused drifts and differences between converter and associated circuitry ground potentials.

It will be realized by those skilled in the art to which the invention pertains, that by ordinary skills a variety of differently appearing and constructed A/D converters may be designed and built utilizing the features of the invention as embodied in the above described examples of the device of the invention. Accordingly, since the structures of this invention are susceptible to such modifications, the invention is to be considered as being limited only by the appended claims.

I claim:

1. Apparatus for converting a bounded, varying analog signal into a frame of digital words, comprising:
   an input circuit for receiving said analog signal from an analog system;
   a plurality of signal generating means;
   signal combining means including means for sequentially coupling said signal generating means to said signal combining means and producing a series of different trial signals one for each different combination of signal generating means coupled to said signal combining means;
   means for generating a correction signal having a magnitude proportional to a difference between ground potentials for said apparatus and said analog system;
   means for combining said correction signal and said trial signals to produce corrected trial signals;
   comparator means for comparing said analog signal with each corrected trial signal and developing a control signal indicative of said comparison;
   means responsive to said control signal for controlling the combination of signal generating means coupled to said signal combining means such that said corrected trial signals approach said analog signal;
   and output means responsive to the combination of signal generating means coupled to said signal combining means for developing a digital word indicative of the magnitude of said analog signal.

2. Apparatus for converting a bounded, varying analog signal into a frame of digital words, comprising:

an input circuit for receiving said analog signal from an analog system, said input circuit including means for periodically sampling said analog signal and holding said sample while a digital word indicative of the value of said sample is being generated;

a plurality of signal generating means;

signal combining means including means for sequentially coupling said signal generating means to said signal combining means and producing a series of different trial signals one for each different combination of signal generating means coupled to said signal combining means;

means for generating a correction signal having a magnitude proportional to a difference between ground potentials for said apparatus and said analog system;

means for combining said correction signal and said trial signals to produce corrected trial signals;

comparator means for comparing said sample signal with each corrected trial signal and developing a control signal indicative of said comparison;

means responsive to said control signal for controlling the combination of signal generating means coupled to said signal combining means such that said corrected trial signals approach said sample signal;

and output means responsive to the combination of signal generating means coupled to said signal combining means for developing a digital word indicative of the magnitude of said sample signal.

3. Apparatus for converting a bounded varying analog voltage signal into a frame of digital words, comprising:

an input circuit for receiving said analog voltage signal from an analog system, said input circuit including means for periodically sampling said analog signal and holding said sample voltage signal while a digital word indicative of the magnitude of said sample is being generated;

a plurality of sources of electrical signals;

summation means for producing an output signal proportional to the sum of the magnitudes of electrical signals applied thereto;

a plurality of bi-stable elements, one for each bit position in said digital word being generated, each bi-stable element having a first and a second stable state and each connecting a different one of said sources to said summation means when in a first stable state and disconnecting said different one of said sources from said summation means when in a second stable state;

control means for unconditionally individually setting said bi-stable elements to said first state in a logical sequence to vary said output signal of said summation means;

means for establishing a correction signal having a magnitude proportional to a difference between ground potentials for said apparatus and said analog system;

means for applying said correction signal to said summation means to produce a corrected output signal;

comparator means for determining a difference between the magnitude of said sample voltage signal and said corrected output signal and producing a control signal indicative of said difference;

means response to said control signal for conditionally re-setting a particular bi-stable element to said second stable state when said eletrical signals connected to said summation means by said bi-stable elements cause said corrected output to exceed said sample voltage signal during each sequence whereby the state of said bi-stable elements after re-set define digital representations of said sample voltage signal;

and output means for providing a digital word output representative of the states of said bi-stable elements for each sequence.

4. Apparatus for converting a bounded varying analog voltage signal into a frame of digital words each of a predetermined number of bits, comprising:

an input circuit for receiving said analog voltage signal from an analog system, said input circuit including means for periodically sampling said analog signal and holding said sample voltage signal while a digital word indicative of the magnitude of said sample voltage is being generated;

comparator means having first and second inputs and an output, said comparator being adapted to generate a difference indicating signal at said output, said difference indicating signal being of a predetermined value when a voltage applied to said first input exceeds a voltage applied to said second input;

means for applying said sample voltage signal to said first input of said comparator means;

a plurality of trial current sources;

trial summation means having a plurality of inputs and an output, said trial summation means being adapted to produce trial voltage signals of different magnitudes for each different combination of trial current sources operatively coupled to said inputs of said trial summation means, said output being coupled to said second input of said comparator means;

a plurality of trial bi-stable elements, one for each bit position in said digital word being generated, each trial bi-stable element having a first and a second stable state and operatively coupling a different trial current source to said trial summation means when in said first stable state;

signal generating means for cyclically generating electrical signals indicative of successive bit positions in the digital word being generated;

trial input logic means coupled to said trial bi-stable elements, said signal generating means, and to said output of said comparator means for causing said trial bi-stable elements to unconditionally switch to said first stable states in a predetermined logical sequence in response to said signals generated by said signal generating means and for conditionally re-switching a predetermined unconditionally switched trial bi-stable element to a second state when said difference indicating signal is of its predetermined value;

switching means for periodically connecting said input means to ground for said apparatus such that the states of said trial bi-stable elements periodically form a digital correction word indicative of a difference between ground potentials for said apparatus and said analog system;

a correction network for developing a correction output voltage corresponding to a digital word applied thereto;

means for transferring said digital correction word from said trial bi-stable elements to said correction network whereby a correction voltage is developed by said correction network;

means for applying said correction voltage to said output of said trial summation means whereby a corrected trial voltage is applied to said second input of said comparator means for each bit position of said digital word being generated;

and output means for reading the states of said trial bi-stable elements after the conditional switching of said bi-stable elements to produce a digital word output signal indicative of the value of said sample voltage signal.

5. Apparatus for converting a bounded varying analog voltage signal into a frame of digital words each of a predetermined number of bits, comprising:

an input circuit for receiving said analog voltage signal;

comparator means having first and second inputs and an output, said comparator being adapted to generate a difference indicating signal at said output, said difference indicating signal being of a predetermined value when a voltage applied to said first input exceeds a voltage applied to said second input;

means for applying said analog voltage signal to said first input of said comparator means;

a plurality of trial current sources;

trial summation means having a plurality of inputs and an output, said trial summation means being adapted to produce trial voltage signals of different magnitudes for each different combination of trial current sources operatively coupled to said inputs of said trial summation means, said output being coupled to said second input of said comparator means;

a plurality of trial bi-stable elements, one for each bit position in said digital word being generated, each trial bi-stable element having a first and a second stable state and operatively coupling a different trial current source to said trial summation means when in said first stable state;

signal generating means for cyclically generating electrical signals indicative of successive bit positions in the digital word being generated;

trial input logic means coupled to said trial bi-stable elements, said signal generating means, and to said output of said comparator means for causing said trial bi-stable elements to unconditionally switch to said first stable states in a predetermined logical sequence in response to said input signals generated by said signal generating means and for conditionally re-switching each last unconditionally switched trial bi-stable element to its zero state when said difference indicating signal is of its predetermined value;

switching means for periodically connecting said input means to ground for said apparatus whereby the states of said trial bi-stable elements form a digital correction word indicative of a difference between ground potentials for said apparatus and said analog system;

a correction network for receiving and storing said correction word including a plurality of correction current sources, a correction summation means having a plurality of inputs and an output coupled to the output of said trial summation means, said correction summation means being adapted to produce correction voltage signals of different magnitudes for each different combination of correction current sources operatively coupled to said inputs of said correction summation means, a plurality of correction bi-stable elements one for each bit position in said correction word, each correction bi-stable element having a first and a second stable state and operatively coupling a different correction current source to said correction summation means when in said first stable state, and a correction input means for receiving said digital correction word and for switching said correction bi-stable elements to states corresponding to the states of said trial bi-stable elements forming said correction word whereby a correction voltage signal is produced at said output of said correction summation means indicative of said digital correction word and a corrected trial voltage is applied to said second input of said comparator means for each bit position in said digital word being generated;

and output means for reading the states of said trial bi-stable elements after the conditional switching of said bi-stable elements to produce a digital word output signal indicative of the value of said sample voltage signal.

6. The combination of claim 5 including means for generating a bias voltage of a predetermined value and means for applying said bias voltage to said output of said correction summation means to provide for bi-polar correction.

7. The apparatus of claim 5 wherein said current sources are stabilized current sources comprising:

an input terminal for receiving a voltage signal;

an output terminal coupled to an input of a summation means;

an input stage including like first and second transistors having matching emitter to base voltages, said first transistor including a base, an emitter and a collector, said base being coupled to said first input terminal and said collector being coupled to a first source of reference potential;

a first resistor coupling the collector of said second transistor to said first reference source;

a second resistor coupling said emitters of said first and second transistors to a second reference source of potential;

a third resistor coupling said second reference source to said base of said second transistor;

and an output stage including third and fourth complementary transistors having an alpha of approximately one, said third and fourth transistors each having a base, an emitter and a collector, said emitter of said third transistor being resistively coupled to said base of said second transistor and to said collector of said fourth transistor, said base of said third transistor being coupled to a junction of said first resistor and said collector of said second transistor, said collector of said third transistor being coupled to said base of said fourth transistor, and said emitter of said fourth transistor being coupled to said output terminal.

8. The apparatus of claim 5 wherein said trial summation means includes a plurality of series resistance means connected in series with said output terminal, one between each pair of input terminals, a plurality of parallel resistance means each coupled between a different input terminal and a source of reference potential, and a primary parallel resistance means coupled between said output terminal of said trial summation means and said output of said correction summation means, said series resistance means each being of a predetermined value, said plurality of parallel resistance means each being substantially equal to twice said predetermined value, and said primary parallel resistance means being substantially equal to twice said predetermined value minus said predetermined value divided by $m$, a predetermined constant greater than unity, and wherein said correction summation means includes a plurality of series resistance means connected in series with said output terminal, one between each pair of input terminals of said correction summation means, and a plurality of parallel resistance means each coupled between a different input terminal for said correction summation means and said source of reference potential, said series resistance means of said correction summation means being substantially equal to said predetermined value divided by $m$ and said parallel resistance means of said correction summation means being substantially equal to twice said predetermined value divided by $m$.

9. Apparatus for converting a bounded varying analog voltage signal into a frame of digital words each of a predetermined number of bits, comprising:

an input circuit for receiving said analog voltage signal from an analog system, said input circuit including means for periodically sampling said analog signal and holding said sample voltage signal while a digital word indicative of the magnitude of said sample voltage is being generated;

comparator means having first and second inputs and an output, said comparator being adapted to generate a difference indicating signal at said output, said difference indicating signal being of a predetermined value when a voltage applied to said first input exceeds a voltage applied to said second input;

means for applying said sample voltage signal to said first input of said comparator means;

a plurality of trial current sources;

trial summation means having a plurality of inputs and an output, said trial summation means being adapted to produce trial voltage signals of different magnitudes for each different combination of trial current sources operatively coupled to said inputs of said trial summation means, said output being coupled to said second input of said comparator means;

a plurality of trial bi-stable elements, one for each bit position in said digital word being generated, each trial bi-stable element having a first and a second stable state and operatively coupling a different trial current source to said trial summation means when in said first stable state;

signal generating means for cyclically generating electrical signals indicative of successive bit positions in the digital word being generated;

means for pre-selecting the number of bit positions in the digital word to be generated;

gating means monitoring said electrical signals generated by said signal generating means for generating an agreement signal when the signal corresponding to the last of the pre-selected number of bit positions is generated;

means responsive to said agreement singal for causing said signal generating means to skip the generation of signals to a signal indicative of the end of the digital word being generated;

trial input logic means coupled to said trial bi-stable elements, said signal generating means, and to said output of said comparator means for causing said trial bi-stable elements to unconditionally switch to said first stable states in a predetermined logical sequence in response to said input signals generated by said signal generating means and for conditionally re-switching predetermined unconditionally switched trial bi-stable elements to a second state when said difference indicating signal is of its predetermined value;

switching means for periodically connecting said input means to ground for said apparatus whereby the states of said trial bi-stable elements form a digital correction word corresponding to a difference between ground potentials for said apparatus and said analog system;

a correction network for receiving and storing said correction word including a plurality of correction current sources, a correction summation means having a plurality of inputs and an output coupled to said output of said trial summation means, said correction summation means being adapted to produce correction voltage signals of different magnitudes for each different combination of correction current sources operatively coupled to said inputs of said correction summation means, a plurality of correction bi-stable elements one for each bit position in said correction word, each correction bi-stable element having a first and a second stable state and operatively coupling a different correction current source to said correction summation means when in said first stable state, and a correction input means for receiving said digital correction word and for switching said correction bi-stable elements to states corresponding to the states of said trial bi-stable elements forming said correction word whereby a correction voltage signal is produced at said output of said correction summation means indicative of said digital correction word and a corrected trial voltage is applied to said second input of said comparator means for each bit position in said digital word being generated;

and output means for reading the states of said trial bi-stable elements after the conditional switching of said bi-stable elements to produce a digital word output signal indicative of the value of said sample voltage signal.

10. Apparatus for converting a bounded varying analog voltage signal into a frame of digital words each of a predetermined number of bits, comprising:

an input circuit for receiving said analog voltage signal from an analog system, said input circuit including means for periodically sampling said analog signal and holding said sample voltage signal while a digital word indicative of the magnitude of said sample voltage is being generated;

comparator means having first and second inputs and an output, said comparator being adapted to generate a difference indicating signal being of a predetermined value when a voltage applied to said first input exceeds a voltage applied to said second input;

means for applying said sample voltage signal to said first input of said comparator means;

a plurality of trial current sources;

trial summation means having a plurality of inputs and an output, said trial summation means being adapted to produce trial voltage signals of different magnitudes for each different combination of trial current sources operatively coupled to said inputs of said trial summation means, said output being coupled to said second input of said comparator means;

a plurality of trial bi-stable elements, one for each bit position in said digital word being generated, each trial bi-stable element having a first and a second stable state and operatively coupling a different trial current source to said trial summation means when in said first stable state;

signal generating means for cyclically generating electrical signals indicative of successive bit positions in the digital word being generated;

means for preselecting the number of bit positions in the digital word being generated;

gating means monitoring said electrical signals generated by said signal generating means for generating an agreement signal when a signal corresponding to the last of the pre-selected number of bit positions is generated;

means responsive to said agreement signal for causing said signal generating means to skip the generation of signals to a signal indicative of the end of the digital word being generated;

means responsive to said agreement signal for releasing said sample voltage signal thereby allowing the sampling and holding of a different analog input signal to said input means;

trial input logic means coupled to said trial bi-stable elements, said signal generating means, and to said output of said comparator means for causing said trial bi-stable elements to unconditionally switch to said first stable states in a predetermined logical sequence in response to said input signals generated by said signal generating means and for conditionally re-switching each last unconditionally switched trial bi-stable element to its zero state when said difference indicating signal is of its predetermined value;

switching means for periodically connecting said input means to ground for said apparatus whereby the states of said trial bi-stable elements form a digital correction word corresponding to a difference between ground potentials for said apparatus and said analog system;

output means for reading the states of said trial bi-stable elements after the conditional switching of said bi-stable elements to produce a digital word output indicative of the valve of said sample voltage signal;

word counter means for counting the number of digital words produced by said output means;

means responsive to said word counter for periodically connecting said input means to ground for said apparatus whereby the stages of said trial bi-stable elements form a digital correction word indicative of a difference between ground potentials for said apparatus and said analog system;

and a correction network for receiving and storing said correction word including a plurality of correction current sources, a correction summation means having a plurality of inputs and an output coupled to said output of said trial summation means, said correction summation means being adapted to produce correction voltage signals of different magnitudes for each different combination of correction current sources operatively coupled to said inputs of said correction summation means, a plurality of correction bi-stable elements one for each bit position in said correction word each correction bi-stable element having a first and a second stable state and operatively coupling a different correction current source to said correction summation means when in said first stable state, and a correction input means for receiving said digital correction word and for switching said correction bi-stable elements to states corresponding to the states of said trial bi-stable elements forming said correction word whereby a correction voltage signal is produced at said output of said correction summation means indicative of said digital correction word and a corrected trial voltage is applied to said second input of said comparator means for each bit position in said digital word being generated.

11. Apparatus for converting a bounded varying analog voltage signal into a frame of digital words each of a predetermined number of bits, comprising:

an input circuit for receiving said analog voltage signal from an analog system, said input circuit including means for periodically sampling said analog signal and holding said sample voltage signal while a digital word indicative of the magnitude of said sample voltage is being generated;

comparator means having first and second inputs and an output, said comparator being adapted to generate a difference indicating signal at said output, said difference indicating signal being of a predetermined value when a voltage applied to said first input exceeds a voltage applied to said second input;

means for applying said analog voltage signal to said first input of said comparator means;

a plurality of trial current sources;

trial summation means having a plurality of inputs and an output, said trial summation means being adapted to product trial voltage signals of different magnitudes for each different combination of trial current sources operatively coupled to said inputs of said trial summation means, said output being coupled to said second input of said comparator means;

a plurality of trial bi-stable elements, one for each bit position in said digital word beng generated, each trial bi-stable element having a first and a second stable state and operatively coupling a different trial current source to said trial summation means when in said first stable state;

signal generating means for cyclically generating electrical signals indicative of successive bit positions in the digital word being generated;

trial input logic means coupled to said trial bi-stable elements, said signal generating means, and to said output of said comparator means for causing said trial bi-stable elements to unconditionally switch to said first stable states in a predetermined logical sequence in response to said input signals generated by said signal generating means and for conditionally re-switching each last unconditionally switched trial bi-stable element to its zero state when said difference indicating signal is of its predetermined value;

switching means for periodically connecting said input means to ground for said apparatus whereby the states of said trial bi-stable elements periodically form a digital correction word indicative of a difference between ground potentials for said apparatus and said analog system;

a correction network for receiving and storing said correction word including a plurality of correction current sources, a correction summation means having a plurality of inputs and an output coupled to the output of said trial summation means, said correction summation means being adapted to produce correction voltage signals of different magnitudes for each different combination of correction current sources operatively coupled to said inputs of said correction summation means, a plurality of correction bi-stable elements one for each bit position in said correction word, each correction bi-stable element having a first and a second stable state and operatively coupling a different correction current source to said correction summation means when in said first stable state, and a correction input means for receiving said digital correction word and for switching said correction bi-stable elements to states corresponding to the states of said trial bi-stable elements forming said correction word whereby a correction voltage signal is produced at said output of said correction summation means indicative of said digital correction word and a corrected trial voltage is applied to said second input of said comparator means for each bit position in said digital word being generated;

and output means for reading the states of said trial bi-stable elements after the conditional switching of said bi-stable elements to produce a digital word output signal indicative of the value of said analog voltage signal.

12. Apparatus for converting a bounded varying analog voltage signal into a frame of digital words each of a predetermined number of bits, comprising:

an input circuit for receiving said analog voltage signal from an analog system, said input circuit including means for sampling said analog signal and holding said sample voltage signal while a digital word indicative of the magnitude of said sample voltage is being generated;

comparator means having first and second inputs and an output said comparator being adapted to generate a difference indicating signal at said output, said difference indicating signal being of a predetermined value when a voltage applied to said first input exceeds a voltage applied to said second input;

means for applying said sample voltage signal to said first input of said comparator means;

a plurality of current sources;

summation means having a plurality of inputs and an output, said summation means being adapted to produce voltage signals of different magnitudes for each different combination of current sources operatively coupled to said inputs of said summation means, said output being coupled to said second input of said comparator means;

a plurality of bi-stable elements, one for each bit position in said digital word being generated, each bi-stable element having a first and a second stable state and operatively coupling a different trial current source to said summation means when in said first stable state;

signal generating means for cyclically generating electrical signals indicative of successive bit positions in the digital word being generated;

means for pre-selecting the number of bit positions in the digital word to be generated;

gating means monitoring said electrical signals generated by said signal generating means for generating an agreement signal when the signal corresponding to the last of the pre-selected number of bit positions is generated;

means responsive to said agreement signal for causing said signal generating means to skip the generation of signals to a signal indicative of the end of the digital word being generated;

input logic means coupled to said bi-stable elements, said signal generating means, and to said output of said comparator means for causing said bi-stable elements to unconditionally switch to said first stable states in a predetermined logical sequence in response to said input signals generated by said signal generating means and for conditionally re-switching a predetermined unconditionaly switched bi-stable element to its zero state when said difference indicating signal is of its predetermined value;

output means for reading the states of said bi-stable elements after the conditional switching of said bi-stable elements to produce a digital word output signal indicative of the value of said sample voltage signal;

and means responsive to the signals generated by said signal generating means for releasing said sample voltage in said input circuit upon development of said digital outptu signal indicative of the magnitude of said sample voltage thereby allowing said input circuit to resample said analog voltage signal.

13. Apparatus for converting a bounded varying analog voltage signal into a frame of digital words each of a predetermined number of bits, comprising:

an input circuit for receiving said analog voltage signal from an analog system, said input circuit including means for periodically sampling said analog signal and holding said sample voltage signal while a digital word indicative of the magnitude of said sample voltage is being generated;

comparator means having first and second inputs and an output, said comparator being adapted to generate a difference indicating signal at said output, said difference indicating signal being of a predetermined value when a voltage applied to said first input exceeds a voltage applied to said second input;

means for applying said sample voltage signal to said first input of said comparator means;

a plurality of trial current sources;

trial summation means having a plurality of inputs and an output, said trial summation means being adapted to produce trial voltage signals of different magnitudes for each different combination of trial current sources operatively coupled to said inputs of said trial summation means, said output being coupled to said second input of said comparator means;

a plurality of trial bi-stable elements, one for each bit position in said digital word being generated, each trial bi-stable element having a first and a second trial current source to said trial summation means when in said first stable state;

signal generating means for cyclically generating electrical signals indicative of successive bit positions in the digital word being generated;

means for pre-selecting the number of bit positions in the digital word to be generated;

gating means monitoring said electrical signals generated by said signal generating means for generating an agreement signal when the signal corresponding to the last of the pre-selected number of bit positions is generated;

means responsive to said agreement signal for causing said signal generating means to skip the generation of signals to a signal indicative of the end of the digital word being generated;

trial input logic mean coupled to said trial bi-stable elements, said signal generating means, and to said output of said comparator means for causing said trial bi-stable elements to unconditionally switch to said first stable states in a predetermined logical sequence in response to said input signals generated by said signal generating means and for conditionally re-switching predetermined unconditionally switched trial bi-stable elements to a second state when said difference indicating signal is of its predetermined value;

means for generating a correction voltage signal having a magnitude proportional to a difference between ground potentials for said apparatus and said analog system and for applying said correction voltage signal to said second input of said comparator means whereby a corrected trial voltage is applied to said second input of said comparator means for each bit position in said digital word being generated;

and output means for reading the states of said trial bi-stable elements after the conditional switching of said bi-stable elements to produce a digital word output signal indicative of the value of said sample voltage signal.

14. Apparatus for converting a bounded varying analog voltage signal into a frame of digital words each of a predetermined number of bits, comprising:

an input circuit for receiving said analog voltage signal from an analog system, said input circuit including means for periodically sampling said analog signal and holding said sample voltage signal while a digital word indicative of the magnitude of said sample voltage is being generated;

comparator means having first and second inputs and an output, said comparator being adapted to generate a difference indicating signal being of a predetermined value when a voltage applied to said first input exceeds a voltage applied to said second input;

means for applying said sample voltage signal to said first input of said comparator means;

a plurality of trial current sources;

trial summation means having a plurality of inputs and an output, said trial summation means being adapted to produce trial voltage signals of different magnitudes for each different combination of trial current sources operatively coupled to said inputs of said trial summation means, said output being coupled to said second input of said comparator means;

a plurality of trial bi-stable elements, one for each bit position in said digital word being generated, each trial bi-stable element having a first and a second stable state and operatively coupling a different trial current source to said trial summation means when in said first stable state;

signal generating means for cyclically generating electrical signals indicative of successive bit positions in the digital word being generated;

means for pre-selecting the number of bit positions in the digital word being generated;

gating means monitoring said electical signals generated by said signal generating means for generating an agreement signal when a signal corresponding to the last of the pre-selected number of bit positions is generated;

means responsive to said agreement signal for causing said signal generating means to skip the generation of signals to a signal indicative of the end of the digital word being generated;

means responsive to said agreement signal for releasing said sample voltage signal thereby allowing the sampling and holding of a different analog input signal to said input means;

trial input logic means coupled to said trial bistable elements, said signal generating means, and to said output of said comparator means for causing said trial bi-stable elements to unconditionally switch to said first stable states in a predetermined logical sequence in response to said input signals generated by said signal generating means and for conditionally re-switching each last unconditionally switched trial bi-stable element to its zero state when said difference indicating signal is of its predetermined value;

switching means for periodically connecting said input means to ground for said apparatus whereby the states of said trial bi-stable elements form a digital correction word corresponding to a difference between ground potentials for said apparatus and said said analog system;

output means for reading the states of said trial bi-stable elements after the conditional switching of said bi-stable elements to produce a digital word output indicative of the value of said sample voltage signal;

word counter means for counting the number of digital words produced by said output means;

and means responsive to said word counter for periodically generating a correction voltage signal having a magnitude proportional to a difference between ground potentials for said apparatus and said analog system and for applying said correction voltage signal to said second input of said comparator means whereby a corrected trial voltage is applied to said second input of said comparator means for each bit position in said digital word being generated.

References Cited

UNITED STATES PATENTS

| | | | |
|---|---|---|---|
| 2,970,309 | 1/1961 | Towles | 340—347 |
| 3,019,426 | 1/1962 | Gilbert | 340—347 |
| 3,298,014 | 1/1967 | Stephenson | 340—347 |
| 3,345,630 | 10/1967 | Tada | 340—347 |

MAYNARD R. WILBUR, Primary Examiner

J. GLASSMAN, Assistant Examiner

U.S. Cl. X.R.

235—154

PO-1050
(5/69)

UNITED STATES PATENT OFFICE
CERTIFICATE OF CORRECTION

Patent No. 3,469,256            Dated September 23, 1969

Inventor(s)    R. G. RUNGE

It is certified that error appears in the above-identified patent and that said Letters Patent are hereby corrected as shown below:

Column 32, Claim 7, line 9, delete "first".

Column 37, Claim 13, line 60, after "second", insert --stable state and operatively coupling a different--.

SIGNED AND
SEALED
DEC 23 1969

(SEAL)
Attest:

Edward M. Fletcher, Jr.
Attesting Officer

WILLIAM E. SCHUYLER, JR.
Commissioner of Patents